United States Patent [19]

Kanagawa et al.

[11] Patent Number: 5,343,342
[45] Date of Patent: Aug. 30, 1994

[54] MAGNETIC RECORDING AND PLAYBACK SYSTEM WITH FEEDBACK CONTROL OF A MOVABLE TRANSDUCER HEAD

[75] Inventors: Yuji Kanagawa; Masato Nagasawa; Eiji Yokoyama; Kimihide Nakatsu; Toshiharu Miyago, all of Nagaokakyo, Japan

[73] Assignee: Mitsubishi Denki Kabushiki Kaisha, Tokyo, Japan

[21] Appl. No.: 672,876

[22] Filed: Mar. 20, 1991

[30] Foreign Application Priority Data

Mar. 27, 1990 [JP] Japan ............... 2-77575

[51] Int. Cl.⁵ ............................. G11B 21/02
[52] U.S. Cl. ............... 360/77.16; 360/77.13; 360/75
[58] Field of Search ........ 360/75, 77.16, 77.12, 360/105, 107, 109, 77.13, 77.14, 77.15

[56] References Cited

U.S. PATENT DOCUMENTS

| | | | |
|---|---|---|---|
| 4,366,515 | 12/1982 | Takano et al. | 360/77 |
| 4,882,635 | 11/1989 | Sanai | 360/10.2 |
| 4,930,030 | 5/1990 | Yabu et al. | 360/107 |
| 5,166,848 | 11/1992 | Plachy | 360/77.16 |

FOREIGN PATENT DOCUMENTS

| | | | |
|---|---|---|---|
| 3009469 | 9/1980 | Fed. Rep. of Germany | 360/77 |
| 3515806 | 11/1985 | Fed. Rep. of Germany | 360/77 |
| 60-1619 | 1/1985 | Japan | 360/77.14 |
| 2160348 | 12/1985 | United Kingdom | 360/77 |

OTHER PUBLICATIONS

"Translation of German Official Action", German Patent Office, May 18th, 1992 (pp. 2–5).

*Primary Examiner*—Aristotelis Psitos
*Assistant Examiner*—Duncan Wilkinson

[57] ABSTRACT

In a magnetic recording/playback system having a magnetic head drive device for moving a movable head disposed within and mounted to a rotating upper drum in parallel with the axis of the drum, and a fixed drum supporting the upper drum so that the upper drum can rotate, an AC magnetic field generator is disposed along the peripheral surfaces of the drums at a location at which the magnetic tape is not wrapped on the drums. The AC magnetic field generator applies an AC magnetic field to the movable head that varies in the direction of the axis of the drums. Information on the position of the movable head is detected in accordance with the detection signal of the AC magnetic field derived by the movable head and the position of the movable head is controlled by feeding the detected positional infromation back to the magnetic head driving device.

39 Claims, 25 Drawing Sheets

HEAD HEIGHT POSITION

F I G. 11
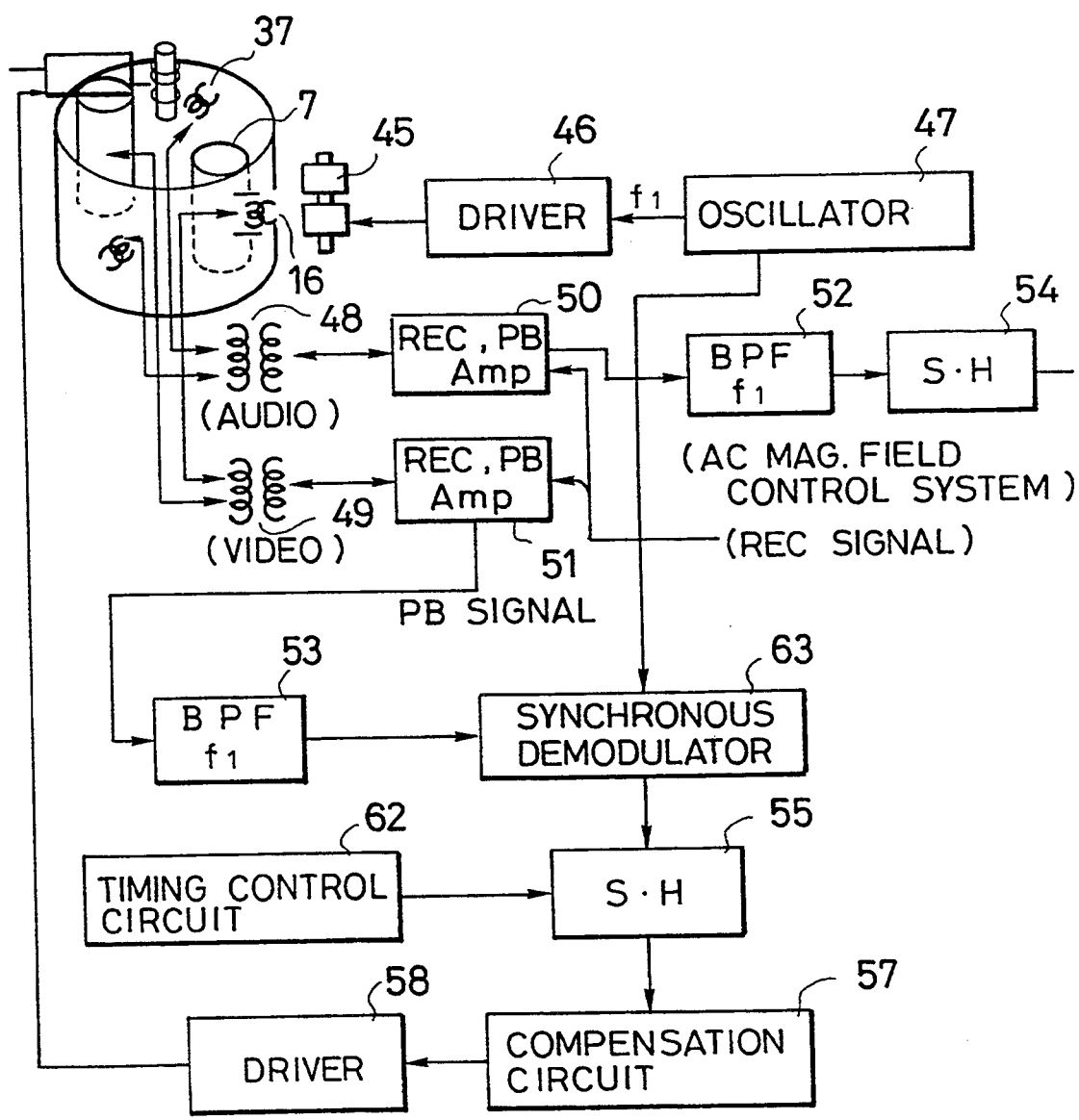

F I G. 14
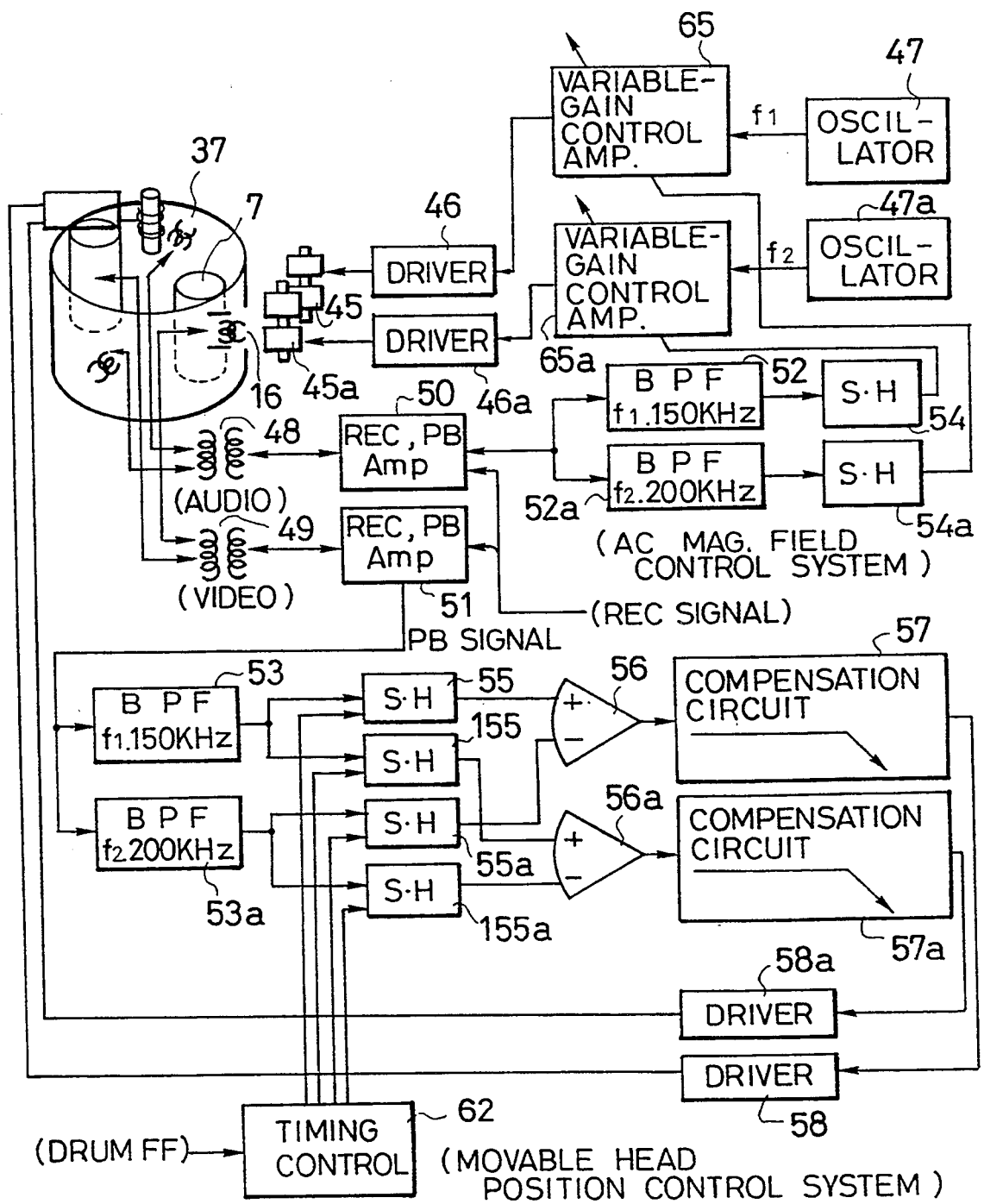

F I G. 17
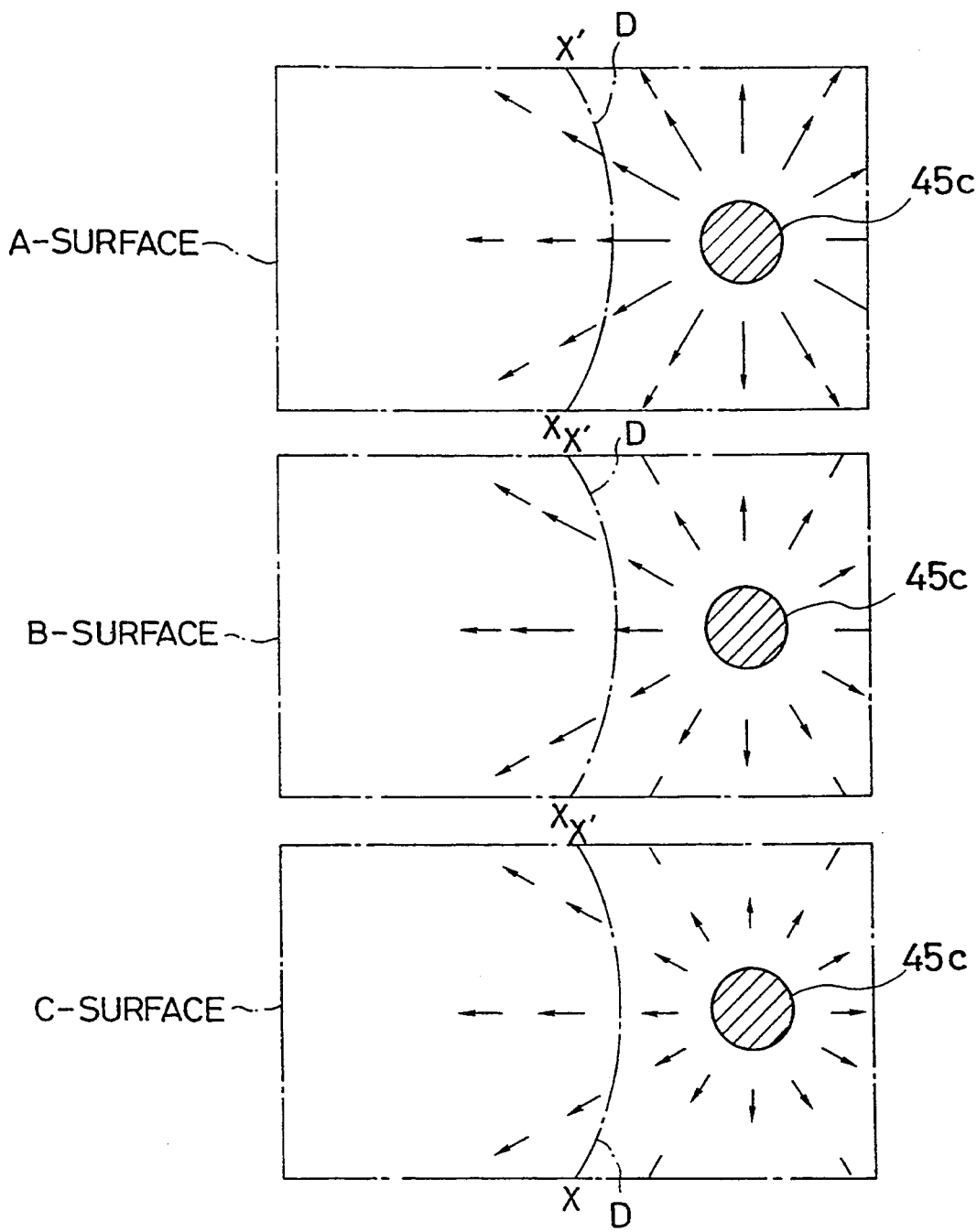

(a)

(b)

(A) DR: 0.4V (DS: 24μm)
SH(0.15V)
0V (REFERENCE FOR ACTUATOR DRIVE VOLTAGE)

(B) DR: 0.2V (DS: 12μm)
SH(0.09V)
0V (C) 0V
SH(-0.09V)
DR: -0.2V (DS: -12μm)

(D) 0V
SH(-0.18V)
DR: -0.4V (DS: -24μm)

MAGNETIC RECORDING AND PLAYBACK SYSTEM WITH FEEDBACK CONTROL OF A MOVABLE TRANSDUCER HEAD

FIELD OF THE INVENTION

The subject invention is related to a magnetic recording/playback device equipped with heads that move within a rotary drum, as in video tape recorders (VTRs) and digital audio tape recorders, and, more specifically, to the positioning device for the movable eads.

BACKGROUND OF THE INVETNION

FIG. 24 is a cross-sectional view showing the main components of a conventional magnetic recording/playback device, and FIG. 25 is a sectional view along line S25-S25 in FIG. 24.

In the figures, a reference numeral 1 designates a fixed lower drum; 2 designates a bearing mounted to this lower drum; 3 designates a shaft that rotates supported by bearing 2; 4 designates a base block firmly attached to the rotary shaft 3; 5 designates a rotating upper drum mounted to base block 4 by means of a screw 6; 7 designates an actuator mounted to upper drum 5 by means of a screw 8; 9 designates a lower transformer mounted to lower drum 1; 10 designates an upper transformer mounted ot base blcok 4; 11 designates a wiring board mounted to upper drum 5; 12 designates a non-rotary contact for the purpose of supplying a control current to actuator 7; 13 designates a rotary electrode disposed on a portion of base block 4 to provide slidable contact with contact 12; and 14 designates a connector that provides electrical conductivity from electrode 13 through connector 15 and wiring board 11 to actuator 7. A reference numeral 16 designates a magnetic head mounted to actuator 7 (hereinafter referred to as the movable head), and is in electrical contact with upper transformer 10 through connector 17, wiring board 11 and connector 15. A reference numeral 18 designates a concavity provided in one part of upper drum 5 to accommodate actuator 7, with space to spare to allow for adjustments in the position of movable head 16. A reference numeral 19 (FIG. 25) designates a hole for the positional adjustment of movable head 16; and 20 designates the magnetic tape which is obliquely wrapped around the outer circumferential surfaces of the lower drum 1 and the upper drum 5, so as to travel on the surfaces at a predetermined speed, coming into slidable contact with moving magnetic head 16.

FIG. 26 is a plan view of actuator 7, FIG. 27 is a cross-sectional view along line S27—S27 in FIG. 26, and FIG. 28 is a side view along line S28—S28 in FIG. 26, in which a reference numeral 21 designates a first yoke composed of magnetic material; 22 designates a first rod-shaped permanent magnet, which is fixed to first yoke 21; 23 designates a second yoke composed of magnetic material, which has on its inner surface a protuberance 23b and is mounted to first yoke 21; 24 designates a third yoke, which is made of magnetic material and mounted to second yoke 23; 25 designates a second rod-shaped permanent magnet, which is fixed to third yoke 24 in such a way that one of its magnetic poles is facing a like pole of first permanent magnet 22; 26 designates pole pieces made of magnetic material, located between second permanent magnet 25 and first permanent magnet 22 and fixed to either one or the other; and 27 designates a plate spring made of non-magnetic sheet material the periphery of which is clamped by first yoke 21 and second yoke 23, and an extension 27a of which protrudes outward through windows 21a and 23a in first yoke 21 and second yoke 23. Movable head 16 is attached to the end of the extension 27a. A reference numeral 28 designates a plate spring made of non-magnetic sheet material which is clamped between second yoke 23 and third yoke 24; 29 designates mounting pieces held by springs 27 and 28; 30 designates a bobbin fixed by means of a bonding agent 32 to mounting piece 29 at a point such that there is a gap between the inner surface of bobbin 29 and the outer surfaces of first permanent magnet 22, second permanent magnet 25 and pole piece 26; and 31 designates a coil made of coated electrical wire that is wound onto bobbin 30 and held in the annular gap G formed between the protuberance 23b of second yoke 23.

FIG. 29 is a representation of magnetic heads mounted on upper drum 5 for use with magnetic tape device in the presently used VHS format, in which the movable head 16 is used exclusively in a special playback mode in which the recorded video image data is played back in fast forward or slow motion. A reference numeral 35 designates an EP video head for the extended play mode, in which narrow tracks are formed allowing the recording of video data for an extended period on the tape, 36 designates an SP video head for the standard video recording/playback mode; 37 designates an audio head for the recording/playback of audio data; and 38 designates an erasing head for the erasure of recording tracks one by one during editing.

The following is a description of the operation of magnetic head drive assembly 7, with reference to FIG. 27.

First permanent magnet 22 generates a magnetic flux D by means of a closed magnetic circuit formed by pole piece 26, second yoke 23 and first yoke 21.

Similarly, second permanent magnet 25 generates a magnetic flux E in a direction opposite to that of magnetic flux D by means of a closed magnetic circuit formed by pole piece 26, second yoke 23 and third yoke 24.

Thus magnetic fluxes D and E cross the annular gap G in the same direction, so that the sum of the fluxes of first permanent magnet 22 and second permanent magnet 25 interlinked with coil 31.

When, under this condition, an electrical current is made to flow from contact 12 to coil 31 through electrode 13 and connectors 14 and 15, then coil 31, bobbin 30 and moving magnetic head 16 move as a unit up in the vertical (axial) direction.

This causes moving magnetic head 16 to be displaced in the transverse direction with respect to the recording track on magnetic tape 20, tracing a magnetic recording track with excellent accuracy.

FIG. 30 is a plot of the hysteresis properties of the displacement of moving magnetic head 16 versus the drive current of magnetic head drive 7, and FIG. 31 shows the recording track pattern made of magnetic tape 20 using a magnetic head drive 7 having these hysteresis properties.

As is clear from FIGS. 30 and 31, at the initial stage when magnetic head drive 7 only has been adjusted, the reference position of moving magnetic head 16 will move, due to the hysteresis properties shown in FIG. 30, resulting in an overlap $\alpha$ between adjacent recording tracks T.

Conventional magnetic head drive mechanisms are of the configuration described above and there is a hysteresis between head drive current and the displacement of the moving magnetic head. As a result of this, when the system is set to record after special or normal playback, the moving magnetic head fails to move to the predetermined position, creating a difference in heights between the two oppositely disposed moving magnetic heads..

As a result of this the recording tracks overlap, a good recording track cannot be obtained, and picture quality is adversely affected.

Overcoming these problems by a configuration in which a movable head mounted on an actuator is used for playback only and recording is done by a head fixed to an upper drum would require a new record-only head. More heads mounted on the upper drum would lead to increased costs, and the vibration produced when the tape is brought into contact with the magnetic head would cause a phenomenon known as head beating, with adverse effects on picture quality. The larger number of heads would also require more rotary transformer channels and thus a larger rotary transformer.

SUMMARY OF THE INVENTION

An objective of the subject invention is to overcome the above problems by means of a magnetic recording/playback system that permits the adjustment of movable head height during recording to prevent overlap of the recording tracks and obtain good tracks, thereby improving the quality of the image.

A further objective of the subject invention is to obtain a magnetic recording/playback system in which the differences in height with respect to the audio head and other fixed heads are adjusted so as to provide recording, playback and special playback of image data by means of a movable head, combined with recording of an audio signal and erasure of the recording track in a normal manner.

A recording/playback system according to the subject invention is characterized by including a magnetic field generating system for generating a magnetic field disposed along the periphery of an upper drum at a location at which magnetic tape is not wrapped on it, a detector for determining the position of a movable head based on a signal from the magnetic field detected by a magnetic head, and a circuit for applying feedback control to the magnetic head drive mechanism so as to bring the difference in the level of the position detection signal to a predetermined level.

In accordance with the subject invention, magnetic field information on the differences in height between movable heads and between them and other heads, as detected by the magnetic heads themselves, is used to provide feedback control to an actuator in such a way that these height differences are held to a specified value, so that the height at which the movable head is brought into contact with the magnetic tape is controlled to a specified height.

Further scope of applicability of the present invention will become apparent from the detailed description given hereinafter. However, it should be understood that the detailed description and specific examples, while indicating preferred embodiments of the invention, are given by way of illustration only, since various changes and modifications within th spirit and scope of the invention will become apparent to those skilled in the art from this detailed description.

BRIEF DESCRIPTION OF THE DRAWINGS

The present invention will become more fully undetstood from the detailed description given hereinbelow and the accompanying drawings which are given by way of illustration only, and thus, are not limitative of the present invention and wherein.

FIG. 11 is a block circuit diagram of a fifth embodiment of the present invention.

FIG. 14 is a block circuit diagram of a sixth embodiment of the present invention.

FIGS. 16 through FIG. 19 are drawings to explain the distribution of the magnetic field generated by the AC magnetic field generator in FIG. 5 and the waveform of the detection signal from the movable head.

FIGS. 34(a) and 34 (b) are drawing explaining the operation of an actuator using a bimorph.

DETAILED DESCRIPTION OF THE PREFERRED EMBODIMENTS

Figure 31:
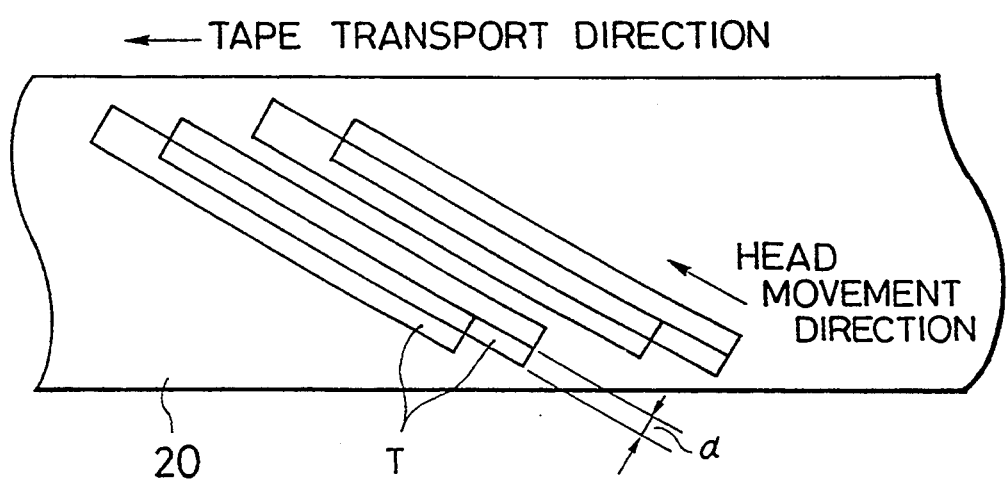
FIG. 31 is a drawing showing the recording track pattern created by a system using a conventional actuator.

In recording with a conventional movable head, a channel-to-channel head height difference occurs as a result of mounting error of the movable head actuator, temperature properties, long-term changes, hysteresis properties, etc., and as is shown in FIG. 31, the recording tracks T may overlap by an amount $\alpha$ and the VHS format collapses. This can be prevented be detecting and correcting the absolute position of the movable head.

There are three possible methods of detecting the absolute position of the movable head:

1) Optical,
2) Electrical, and
3) Magnetic.

Figure 32:
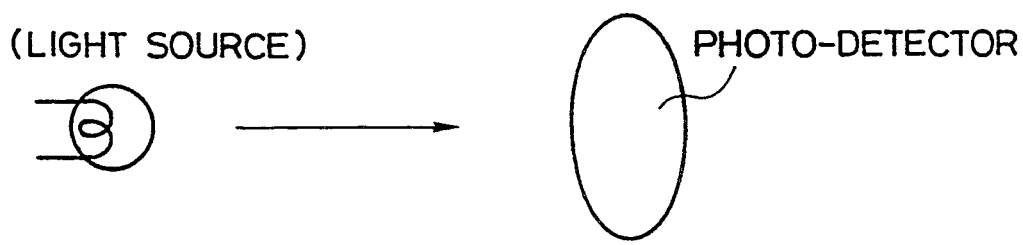
FIGS. 32 and 33 are drawings explaining an optical system for detecting movable head position.

Considering method (1) first, it will be necessary for photodetection to have, at a minimum, a light source and photodetector (FIG. 32). With the light source fixed and the photodetector mounted on the moving portion, or conversely, with the photodetector fixed and the light source mounted on the moving portion, changes in the relative positions of the light source and photodetector are determined by the photodetector, which detects changes in the amount of light from the light source. Positional resolution may be improved with comparative ease by using a lens to collect the beam from the light source, by using a laser as the light source, or by using a photodetector of the split detection type.

This system, however, detects the relative position of the light source and photodetector. Determining the absolute position of the movable head requires that either the light source or the photodetector to be fixed at some reference point, and this means that the other item (i.e., the photodetector or the light source) must be mounted on the movable head assembly. This arrangement, however, is associated with the following problems. First, the considerable additional mass of the movable head assembly will alter the frequency properties of the actuator, with consequent degradation in control performance. Second, either a slip ring to turn on the light source or a rotary transformer to turn it on and off is required, or, alternatively, a slip ring or a rotary transformer to bring out the output of the photodetector is required.

Figure 33:
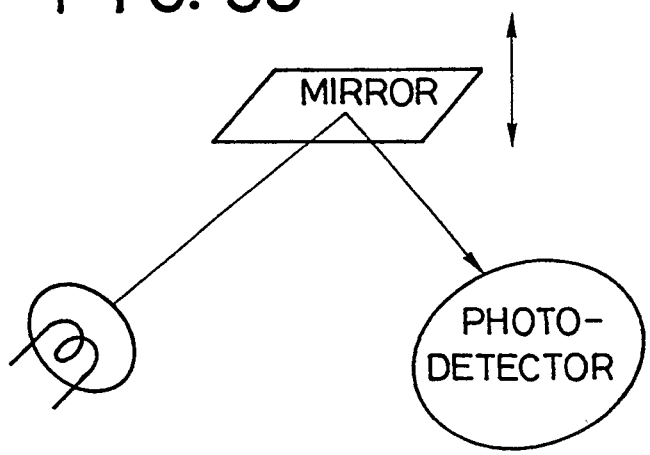

FIG. 33 is a schematic diagram showing a proposal to overcome this problem, in which either a lightweight mirror is mounted on the movable head assembly, or a portion of the surface of the movable head assembly is given a mirror finish to reflect the beam from the light source, thereby avoiding the need to mount the photodetector or light source within the upper drum.

Figure 25:
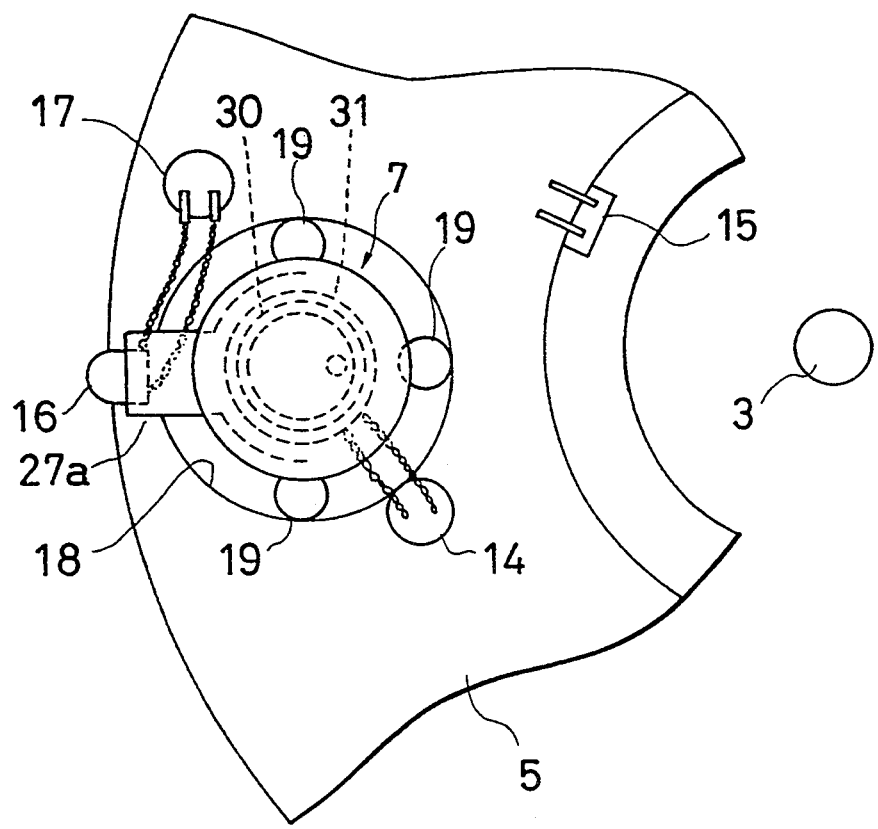
FIG. 25 is a view along line S25—S25 in FIG. 24.
Figure 26:
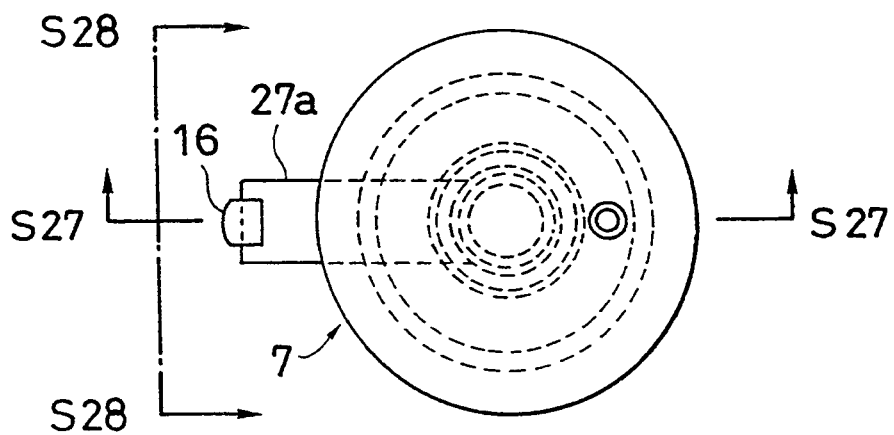
FIG. 26 is an enlarged plan view of an actuator mounting a movable head.
Figure 27:
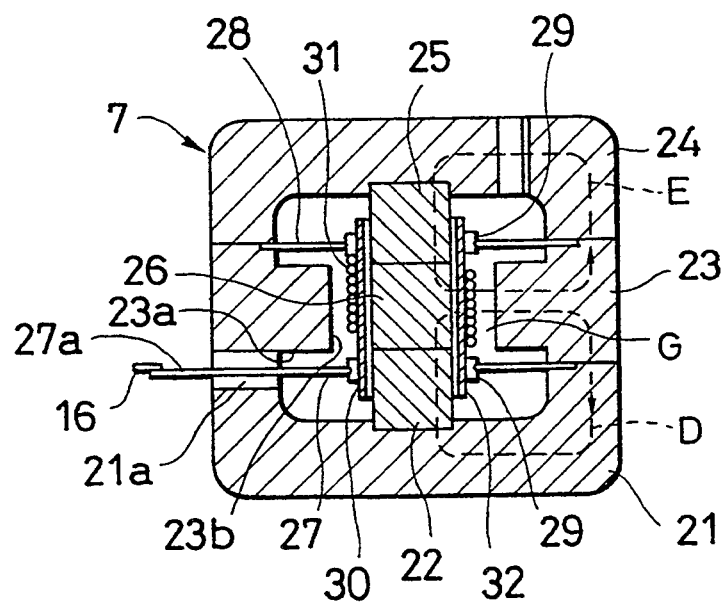
FIG. 27 is a view along line S27—S27 in FIG. 26.
Figure 28:
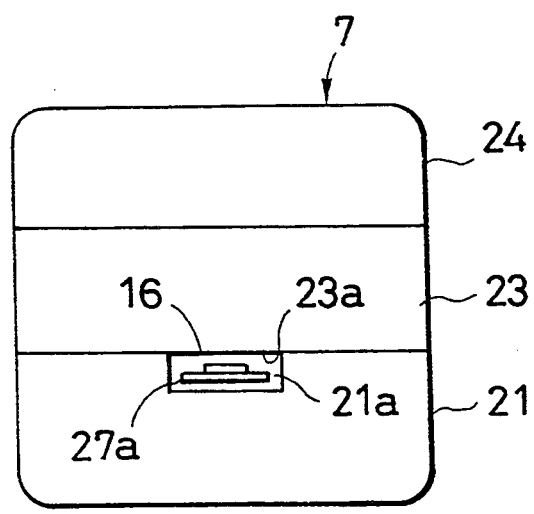
FIG. 28 is a view along line S28—S28 in FIG. 26.
Figure 34:
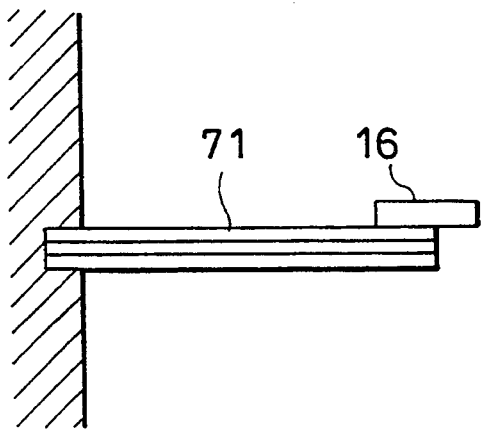
Figure 34:
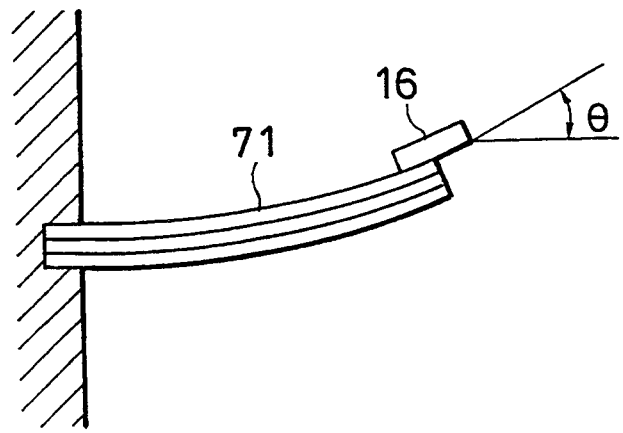

In this structure, however, the attitude of the mirror is of crucial importance. Specifically, such a method assumes that the mirror on the movable head assembly will make a parallel movement (movement which is not accompanied by rotation), whereas the movable head actuators commonly used in VTRs are bimorph (a pair of piezoelectric plates stacked with each other), with the result, as shown in FIG. 34(a) and (b), that the attitude of the movable head is altered as a result of the displacement. Even if use were made of a magnetic drive actuator, as shown in FIG. 25, in which this problem does not occur, there would be a problem concerning the accuracy with which the mirror was mounted on the movable head assembly. Even supposing that the mirror could be mounted accurately, the need remains for accurate determination of the absolute position of the light source and photodetector, and since the light source and photodetector would have to be mounted in the fixed drum, it would not be feasible due to the need for compactness.

Thus it can be seen that there are many problems in the use of optical detection, method (1), and even if solutions were possible, they would not be feasible.

Next let us look at method (2), electrical detection. Specifically, in this method a capacitance sensor is mounted on the movable head assembly, and the absolute position of the movable head assembly is determined by detecting changes in the capacitance produced by differences in the gap between the movable head assembly and the capacitance sensor. The problem with this method is the high cost of the capacitance sensor, making it impracticable in consumer products.

In method (3), magnetic detection, the movable head itself can be used as a sensor, provided an external magnetic field generator is mounted on it. This offers the advantage that there is no need to bother about the mounting accuracy or about the absolute position of the position detecting device, factors that present such a problem in the case of optical detection method (1). And because the movable head itself is the sensor, extremely accurate detection can be obtained by adopting a structure in which abrupt changes occur in the distribution of flux density in the external field in the direction in which position detection is desired. Because of the many advantages associated with method (3) magnetic detection, it is the method adopted in the subject invention. Since the head itself is used as the sensor, its direction of movement is the direction in which detection is possible. A magnetic field generator producing an AC magnetic field, the flux density of which changes abruptly in respect to the direction of movement of the movable head (that is, parallel to the shaft of the upper drum) is mounted on the outer surface of the upper drum (specifically near the periphery at a location at which magnetic tape 20 is not wrapped on it).

The level of the output signal derived from the electromagnetic induction from the magnetic field generator on the movable head (that is, the magnetic sensor) will change abruptly in accordance with the height of the movable head (that is, the magnetic sensor). Thus accurate determination of the position of the movable head can be made by observing these changes in level.

FIRST EMBODIMENT

Figure 1:
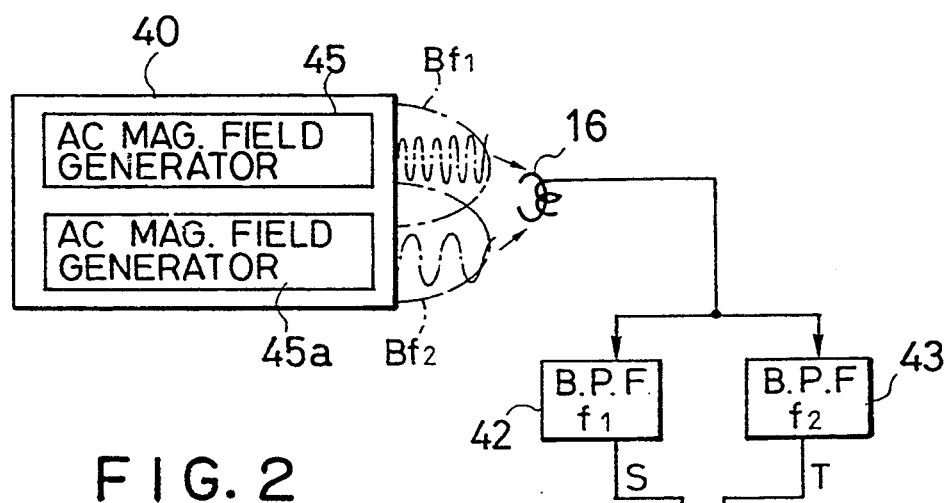
FIG. 1 is a block circuit diagram of an embodiment of the present invention.
Figure 2:
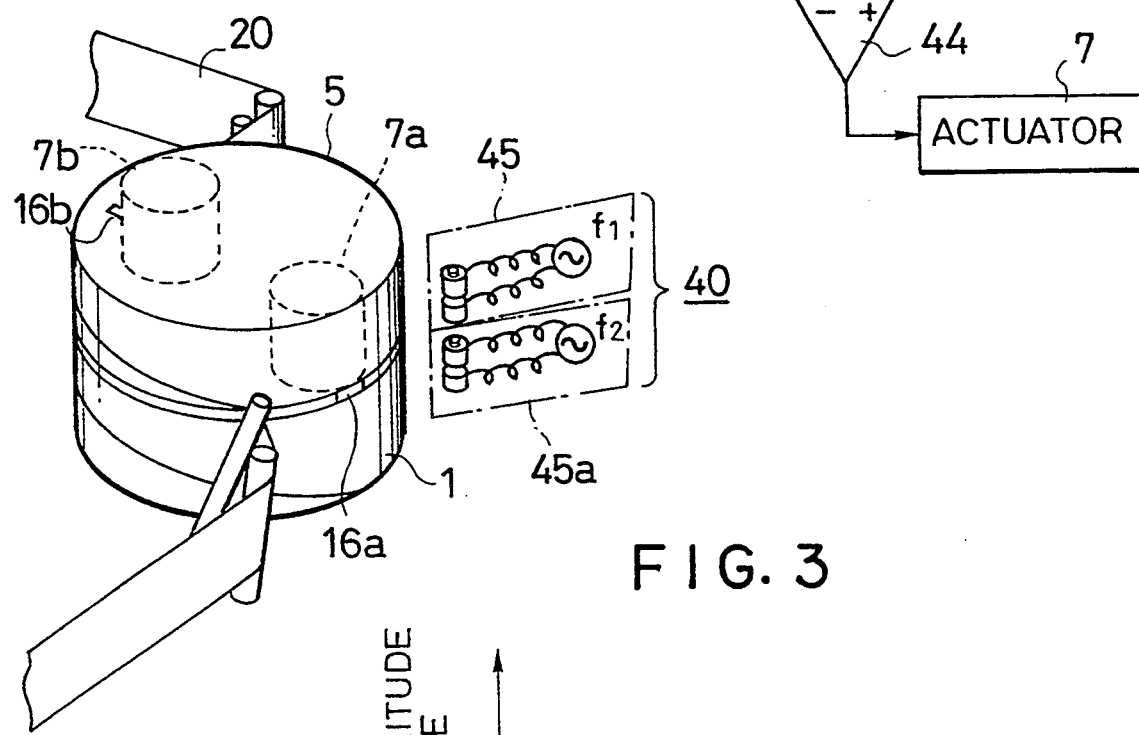
FIG. 2 is a perspective view showing the installed position of the AC magnetic field generator device of this embodiment.

Hereafter is a description of an embodiment of the subject invention based on the figures. FIG. 1 is a block circuit diagram of the control system of one embodiment of the subject invention, and FIG. 2 is perspective view showing the disposition of the magnetic field generator for this embodiment. In the figures, a reference numeral 40 designates an AC magnetic field generator which applies two magnetic fields of differing frequencies $B_{f1}$ and $B_{f2}$ to movable heads 16a and 16b. AC magnetic field generator 40 is disposed along the periphery of upper drum 5 and lower drum 1 at a location at which magnetic tape 20 is not wrapped, and its position is adjustable. AC magnetic field generator 40 is of a structure such that two field generator coils 45 and 45a are arranged in the direction of the axis of rotation of upper drum 5, generating, respectively, two magnetic fields $B_{f1}$ and $B_{f2}$ of frequencies $f_1$ and $f_2$.

A reference numeral 42 designates a bandpass filter that passes the $f_1$ component, 43 designates a bandpass filter that passes the $f_2$ component and 44 designates a differential amplifier.

The following is a description of the operation of this embodiment.

Each time movable head 16 (16a or 16b) passes in the vicinity of AC magnetic field generator 40, it detects fields $B_{f1}$ and $B_{f2}$ produced by AC magnetic field generator coils 45 and 45a, and outputs a detection signal proportional to the strength of these fields. Bandpass filter 42 passes signal component S of frequency $f_1$, while bandpass filter 43 passes signal component T of frequency $f_2$.

Figure 3:
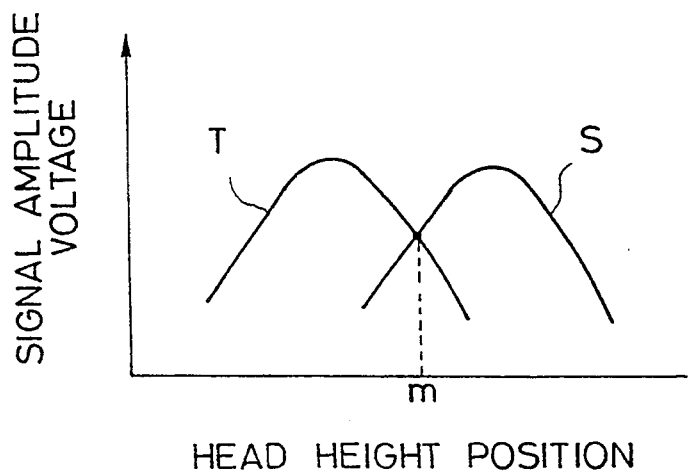
FIG. 3 is a graph showing changes in the level of the two detection signal components S and T relative to the height of the movable head in this embodiment.

The level of signal components S and T then change, as shown in FIG. 3, as movable head 16 moves parallel to the shaft of upper drum 5 (that is, in accordance with changes in the position, i.e., height of the movable head). Now, assume that a symbol m represents that height of movable head 16 at which signal components S and T are equal in level, and that the level of signal components S and T at this time is represented by a symbol k. Subtractor 44 obtains the difference between the values of components S and T and sends the difference as a feedback signal to actuator 7, which shifts movable head 16 in the direction such that the difference approaches zero. That is to say, movable head 16 is moved so that S and T are of the same level, that is, so that the height of movable head 16, is m in FIG. 3. By changing the position etc. of AC magnetic field generator coils 45 and 45a. It is possible to change the position k of the intersection of signal components S and T thereby changing the height of movable head 16, so that the reference point for the height of movable head 16 can be established as desired.

It should be noted that in the embodiment described above, control of a single movable head is described. In a system having a plurality of movable heads it is possible to eliminate the difference between channels during recording by applying the same control actions to each of those movable heads, and to hold the height difference in respect of further fixed heads etc. to the standard value.

SECOND EMBODIMENT

Figure 4:
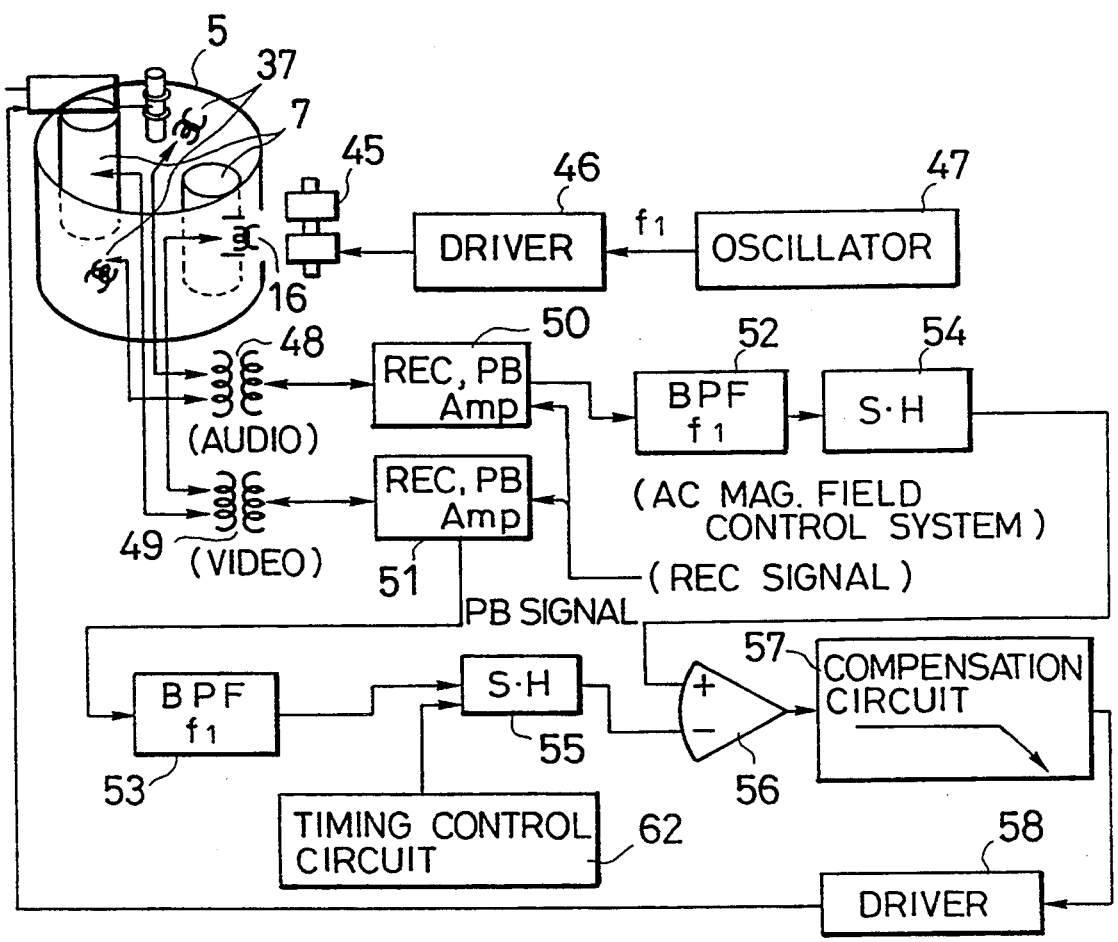
FIG. 4 is a block circuit diagram of a second embodiment of the present invention.
Figure 4:
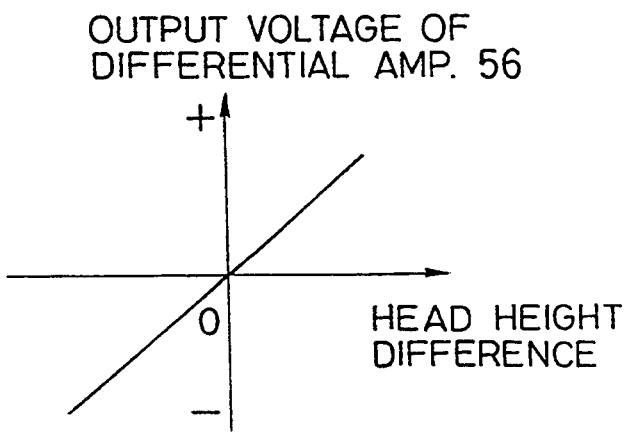

FIG. 4 is a block circuit diagram of a second embodiment, in whichk a reference numeral 46 designates a driver supplying current to coil 45; 47 designates an oscillator producing an AC voltage; 48 and 49 designate rotary transformers that relay signals to and from the magnetic heads within the upper drum; 50 and 51 designate recording/playback amplifiers that amplify the signals from the audio and video heads and supply recording current; 52 designates a bandpass filter that passes only that signal that is due to the electromagnetic induction from oscillator coil 45 reproduced from audio head 37, which is fixed within upper drum 5; 53 designates a bandpass filter that passes only that signal that is due to the electromagnetic induction from oscillator coil 45 reproduced from the movable head 16; 54 designates a sample-hold circuit that holds the value of the amplitude of the electromagnetically induced output of oscillator coil 45 reproduced from audio head 37 every revolution of upper drum 5; 55 designates a sample-hold circuit that holds the value of the amplitude of the electromagnetically induced output of oscillator coil 45 reproduced from movable head 16 every revolution of upper drum 5; 56 designates a differential amplifier that finds the difference between the values in sample-hold circuits 54 and 55: 57 designates a servo compensation circuit having a low-pass filter etc. to assure stability in the position-fixing control loop; and 58 designates a driver that supplies drive current to actuator 7. Reference numeral 62 designates a timing control circuit that controls the sample timing of sample-hold circuit 55.

Figure 5:
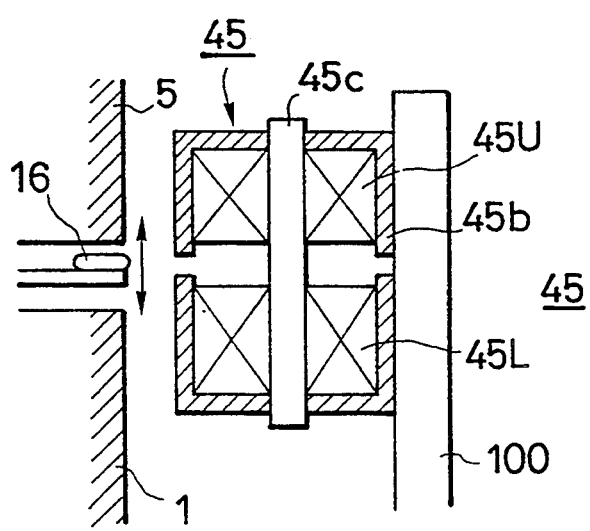
FIG. 5 is a cross-sectional drawing showing the configuration and installed position of the AC magnetic field generator coil of this embodiment.
Figure 6:
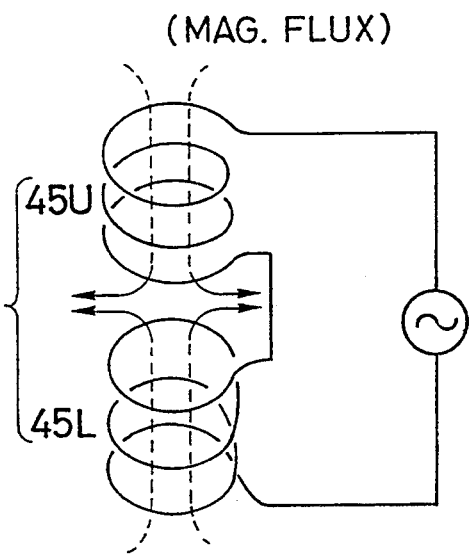
FIG. 6 is a drawing showning the drive source of this AC magnetic field generator coil and its connections.

FIG. 5 is a cross sectional view of AC magnetic field generator coil 45, in which 45C is a magnetic core in which coil flux is concentrated, 45U is a coil in which an alternating current generates an AC magnetic flux in core 45C, 45L is a coil in which the magnetic field is generated in the reverse orientation to that of coil 45U, 45b is a coil holder for coils 45L and 45U, and 100 is a mounting member to hold AC magnetic field generator coil 45 in a fixed position. FIG. 6 illustrates the direction of the magnetic fluxes produced by AC magnetic field generator coil 45.

The following describes the operation.

Figure 7:
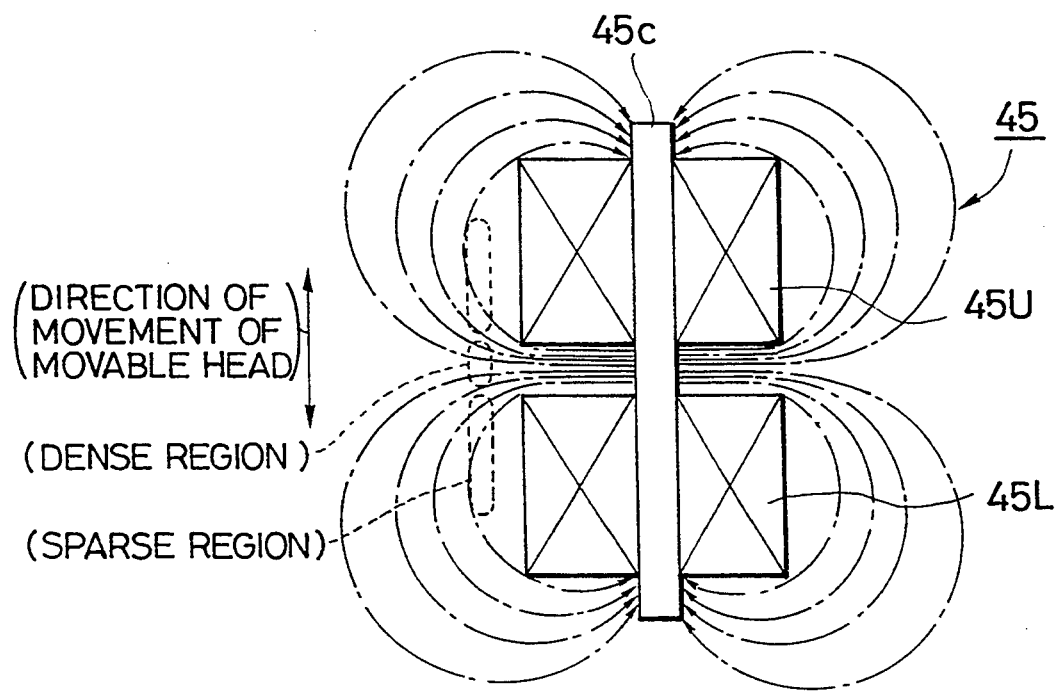
FIg. 7 is a drawing showing the magnetic field distribution of this AC magnetic field generator coil.

As can be seen in FIG. 7, the AC magnetic fluxes of frequency $f_1$ that are produced by coils 45U and 45L of AC magnetic field generator 45 repel each other at the position at which they are opposed, creating areas of greater and lesser magnetic flux density along the vertical axis.

This AC flux is detected when movable head 16 or fixed head 37 passes within the AC magnetic field, and is reproduced by playback amplifiers 50 and 51 through rotary transformers 48 and 49. At this time, the frequency $f_1$ of the oscillator 47 is selected in such a way that it is not lower than the attenuating frequency limit derived from the frequency characteristics of the low-frequency side of rotary transformers 48 and 49, and not higher than the frequency at which the inductance of AC magnetic field generator coil 45 interferes with the supply of drive current. Given that, generally speaking, the attenuation frequency limit of rotary transformers 48 and 49 is from several tens of kilohertz to 100 kHz and that when, for example, coils 45U and 45L have several hundred turns, the frequency at which attenuation due to inductance starts is 1 MHz, $f_1$ would be given a value between 100 kHz and 1 MHz.

According to FIG. 4, in a case, for example, in which the coils 45U and 45L of AC magnetic field generator coil 45 were mounted so that the mid-point between them was at a position higher than the height of fixed head 37 or the neutral position of movable head 16, the amplitude of the reproduced signal of frequency $f_1$ output from playback amplifiers 50 and 51 when magnetic heads 16 and 37 pass in the vicinity of AC magnetic field generator coil 45, would increase when movable head 16 is moved upward (away from the deck base), and would decrease when it is moved downward. Conversely when the coils were installed in the reverse position to the above, the direction of attenuation of the reproduced signal would also be reversed.

Now let us assume that detection sensitivity for the signal output from playback amplifier 50 as the reproduced signal from fixed head 37 and the detection sensitivity for the signal output from playback amplifier 51 as the reproduced signal from the movable head 16 are identical to each other, or that they have been adjusted by means of the gain adjustments of playback amplifiers 50 and 51 so that they are identical.

The outputs of playback amplifiers 50 and 51 are passed through bandpass filters 52 and 53 to remove unwanted noise and pass frequency $f_1$ only, and the values at which these two playback output levels reach a maximum aer either held by sample-hold circuits 54 and 55, or alternatively by peak holding means not shown, the level difference is derived by differential amplifier 56, deriving a voltage function based on the height difference between novable head 16 and fixed head 37. This is passed through first control system phase compensation circuit 57 (such as a low-pass filter), after which driver 58, completing the closed loop, performs control to drive the movable head 16 in a direction such that the height difference is diminished, thereby assuring that there is no height difference between movable head 16 and fixed head 37 even during recording.

Similarly, in a case in which there are two movable heads 16 mounted 180° apart on upper drum 5, the head height difference between the respective channels is also eliminated by configuring a head height position fixing control system as described above for the respective actuators.

In this case the servo band of the position fixing control loop need not be particularly wide since the purpose is to control hieight difference between movable head 16 and fixed head 37, or the discrepancy in height between two movable heads 16. since detection of the head height or height difference is performed on every removolution of the upper drum, due to the dead time resulting form a sampling frequency of 30 Hz when drum speed is 1800 rpm, the control system will oscillate unless the control band is kept to several Hz at the most. Accordingly the time constant and gain of the low-pass filter of compensation circuit 57 is set so that the circuit can assure a phase margin of 60° or to eliminate more at a control band of several Hz.

Head height control during recording is performed with recording/playback amplifier 51 funcioning as the recording amplifier when magnetic head 16 is passing over that side of drums 1 and 5 at which magnetic tape 20 is wrapped on it, and as the playback amplfier when moving coil 16 is passing in the vicinity of AC magnetic field generator coil 45 at a location at which magnetic tape 20 is not wrapped.

the above describes the construction of the head height position control system. In the embodiment shown in FIG. 4, detection sensitivities from heads 16 and 37 to playback amplifiers 50 and 51 must be identical, or adjusted so as to be identical. In practice, it is ferquently impossible to make them equal due to differences in fixed head 37 and movable head 16 in terms of the number of turns, core permeability, amplifier gain and temperature characteristics.

THIRD EMBODIMENT

Figure 8A:
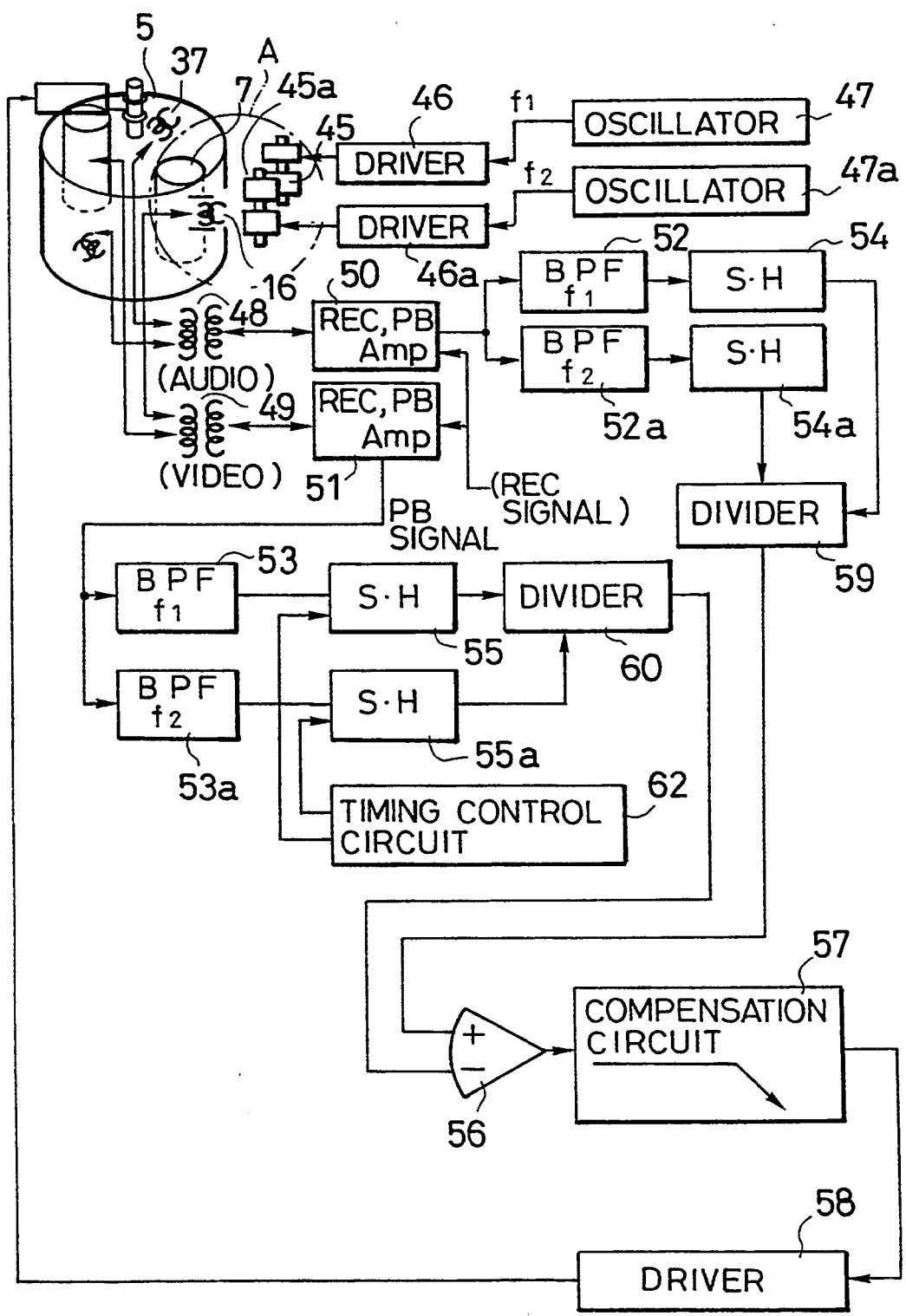
FIG. 8A is a block circuit diagram of a third embodiment of the present invention.

FIG. 8A is a block circuit diagram of the third embodiment of the subject invention, in which two AC magnetic field generator coils 45 and 45a, so configured as to be unaffected by differences in sensitivity of the respective heads, are disposed in the peripheral direction on upper drum 5. A first divider 58 derives a ratio bewteen the playback output amplitudes from the two AC magnetic field generator coils through fixed head 37, a second divider 60 derives a ratio between the playback output amplitudes from the two AC magnetic field genreator coils through movable head 16.

Figure 8B:
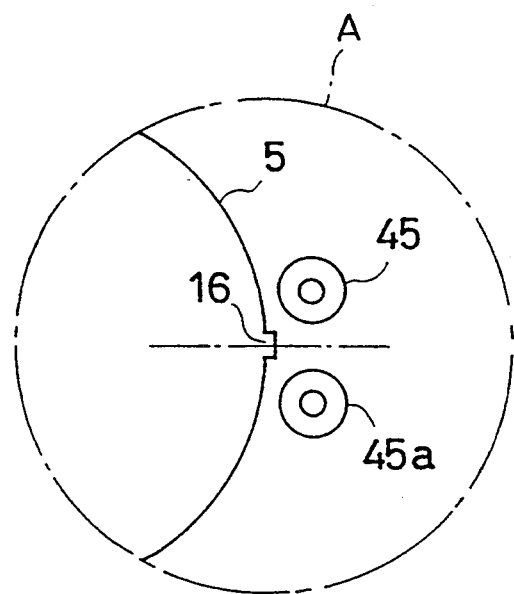
FIG. 8B is an enlarged plan view showing the arrangement of the AC magnetic field generator coils at different positions along the direction of the rotation of the magnetic heads.
Figure 8C:
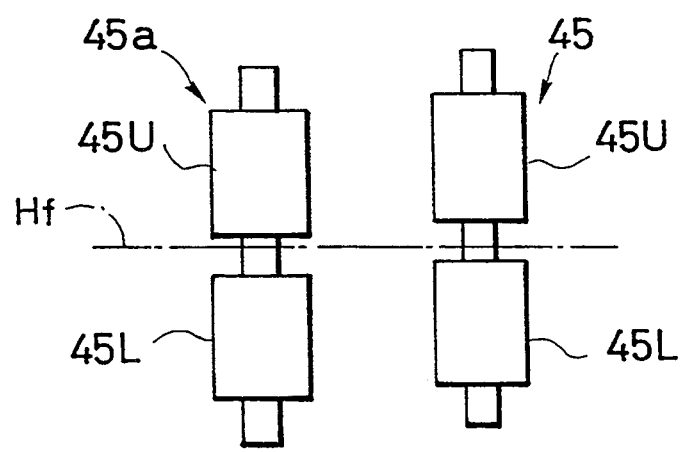
FIG. 8C is an enlarged side view showing the disposition in different heights of the AC magnetic field generator coils of FIG. 8A.

In accordance with this embodiment, there are provided two AC magentic field generator coils 45 and 45a, having oscillation frequencies $f_1$ and $f_2$ that are different. As shown in FIG. 8B, the AC magnetic field generator coils 45 and 45a are disposed at different positions in the direction along the rotation of the movable head. As shown in FIG. 8C, one of the AC magnetic field generator coils, 45, is disposed so that the midpoint between the heights of coils 45U and 45L is higher than the height Hf of fixed head 37, and the other AC magnetic field generator coil 45a is disposed so that the midpoint between the heights of coils 45U and 45L is lower than the height Hf of fixed head 37. The AC magnetic field generator coils 45 and 45a are disposed as described above in order to provide characteristic curves which are shifted relative to each other as shown in FIG. 3.

If at this time the height of movable head 16 is controlled in such a way that the amplitude ratio between the playback output of frequency $f_1$ due to electromagnetic induction from oscillator coil 45 and the playback output of frequency $f_2$ from oscillator coil 45a both of which are detected by fixed head 37 and passed through playback amplifier 50 is identical with the amplitude ratio between the playback outputs that are detected by movable head 16, the height difference between movable head 16 and fixed head 37 will be eliminated, irrespective of differences in the number of head tunrs, permeability of the head core, amplifier gain, or temperature characteristics, provided only that there is no great difference between the fixed head system and the movable head systems in terms of the frequency characteristics of $f_1$ and $f_2$ from the heads to the playback amplifier. Accordingly, the amplitudes of the reproduced signal of bandpass filters 53 and 53a, which pass only playback output frequencies $f_1$ and $f_2$ are derived either by sample-hold circuits 55 and 55a or by peakhold circuits, not shown, and input to a divider to derive a division signal; and, analogously the amplitudes of the signal components of frequency $f_1$ and $f_2$ in the playback output of fixed head 37 are derived by bandpass filters 52 and 52a and sample-hold circuits 54 and 54a, and input to divider 59 to derive a division signal; and the difference between the division signals is derived by differential amplifier 56 such that the direction and magnitude of the height difference between movable head 16 and fixed head 37 are detected.

Taking, for example, a case in which movable head 16 is moved higher (in the direction away from the deck base) then fixed head 37, then the reproduced signal of movable head 16 will have a greater ration of f1 component to f2 component than the reproduced signal of fixed head 37. As a result, the output signal of differential amplifier 56 will be negative, and movable head 16 will be moved downward and fixed at a position such that the height difference is eliminated.

In this way, accurate control of head height can be obtained even if there are differences in the sensitivity between heads 16 and 37, or between head amplifiers 50 and 51. The embodiment shown in FIG. 8, however, requires highly accurate dividers 59 and 60, resulting in higher costs.

In the above, separation at the time of playback is achieved by changing the oscillating frequencies of two coils, but since the coils are disposed in different positions along the direction of rotation of fixed drum 5, and the signal derived from the coils are separated in time, $f_1$ and $f_2$ may be identical. In this case, in place of the band-pass filters 52, 52a, 53 and 53a, circuits which permit passage of the signals only in the respective specific intervals in which the desired signals are expected to appear may be provided.

Figure 8D:
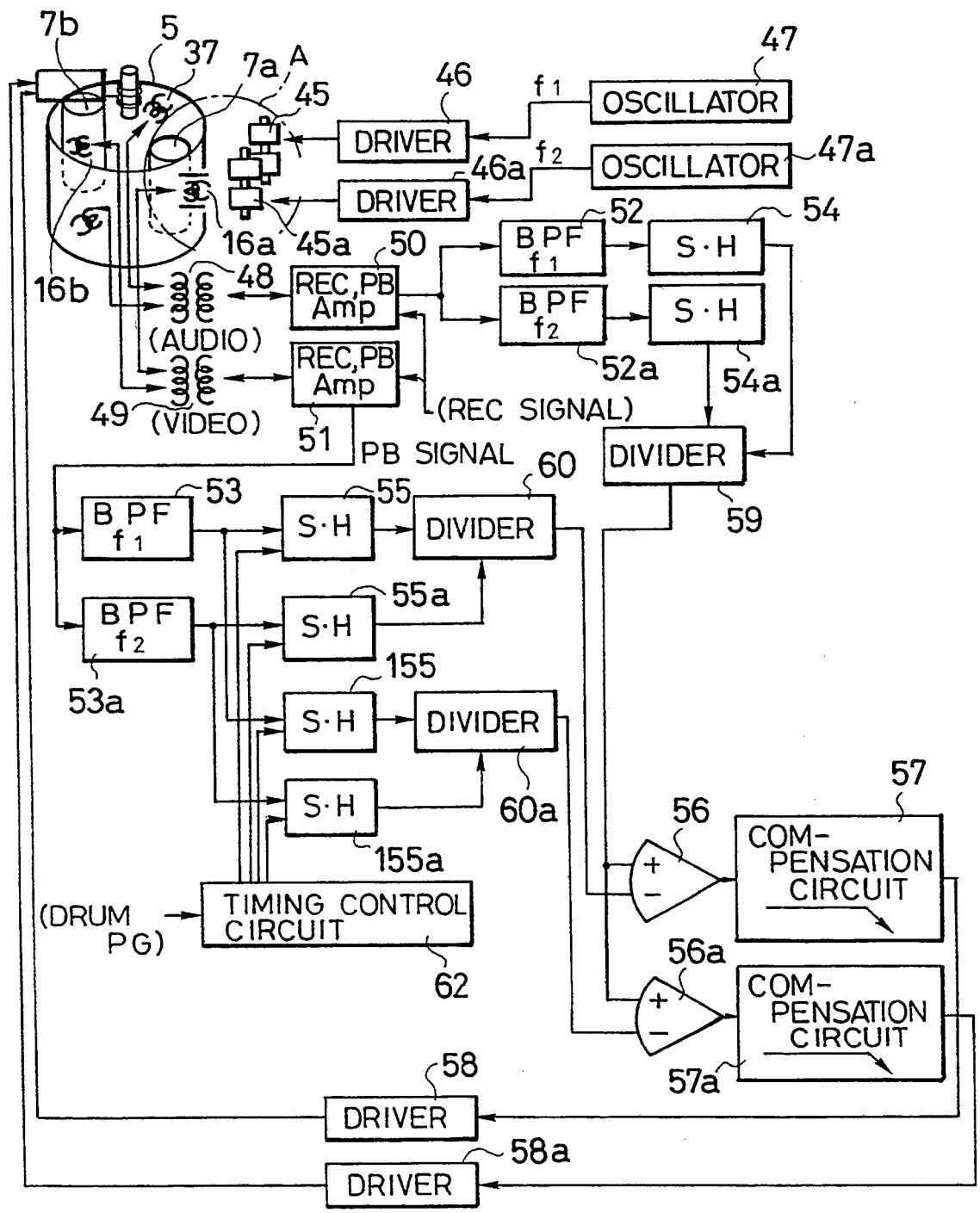
FIG. 8D is a block circuit diagram of a modification of the third embodiment in which two movable heads are shown to be controlled.

The description in connection with movable head position control has been made in connection with a single movable head. In practical applications, two movable heads are often provided, being spaced by 180° from each other. In such a case, two actuators for driving the movable heads and two sets of associated circuits are required. FIG. 8D shows an example of the arrangement for controlling the position of two movable heads. As illustrated, two actuators 7a and 7b are provided for the respective movable heads 16a and 16b, and two drivers 58 and 58a are coupled to the two actuators 7a and 7b. Input to the two drivers 58 and 58a are outputs of compensations circuits 57 and 57a, which receive outputs of the differential amplifiers 56 and 56a. The differential amplifier 56 determines the difference between the outputs of the dividers 59 and 60, as described in connection with the similarly numbered components in FIG. 8A. The differential amplifier 56a determines the difference between the outputs of dividers 59 and 60a.

The sample-hold circuits 55 and 55a are controlled by a timing control circuit 62 to sample the outputs of the bandpass filters 53 and 53a at instance when the outputs of frequencies $f_1$ and $f_2$ from the corresponding movable head 16a via the rotary transformers 48 and 48, and the amplifiers 50 and 51, reach their maxima. The sample-hold circuits 155 and 155a are controlled by the timing control circuit 62 to sample the outputs of the bandpass filters 53 and 53a at instances when the outputs of frequencies $f_1$ and $f_2$ from the corresponding movable head 16b via the rotary transformers 48 and 49, and the amplifiers 50 and 51, reach their maxima. The instance when the output of a frequency $f_1$ from one movable head 16a via the rotary transformer 49 and the amplifier 51, reaches its maximum differs by 180°, in terms of the corresponding rotational angle, from the instance when the output of frequency $f_1$ from the other movable head 16a, via the rotary transformer 49 and the ampifier 51 reaches its maximum. Similarly, the instance when the output of frequency $f_2$ from one movable head 16a via the rotary transformer 49 and the amplifier 51, reaches its maximum differs by 180°, in terms of the corresponding rotational angle, from the instance when the output of frequency $f_2$ from the other movable head 16b, via the rotary transformer 49 and the amplifier 51 reaches its maximum. The timing control circuit 62 is so formed as to provide the sample-hold circuits with timing control signals at respective, different timings when the respective inputs of concern reach their maxima.

FOURTH EMBODIMENT

Figure 9:
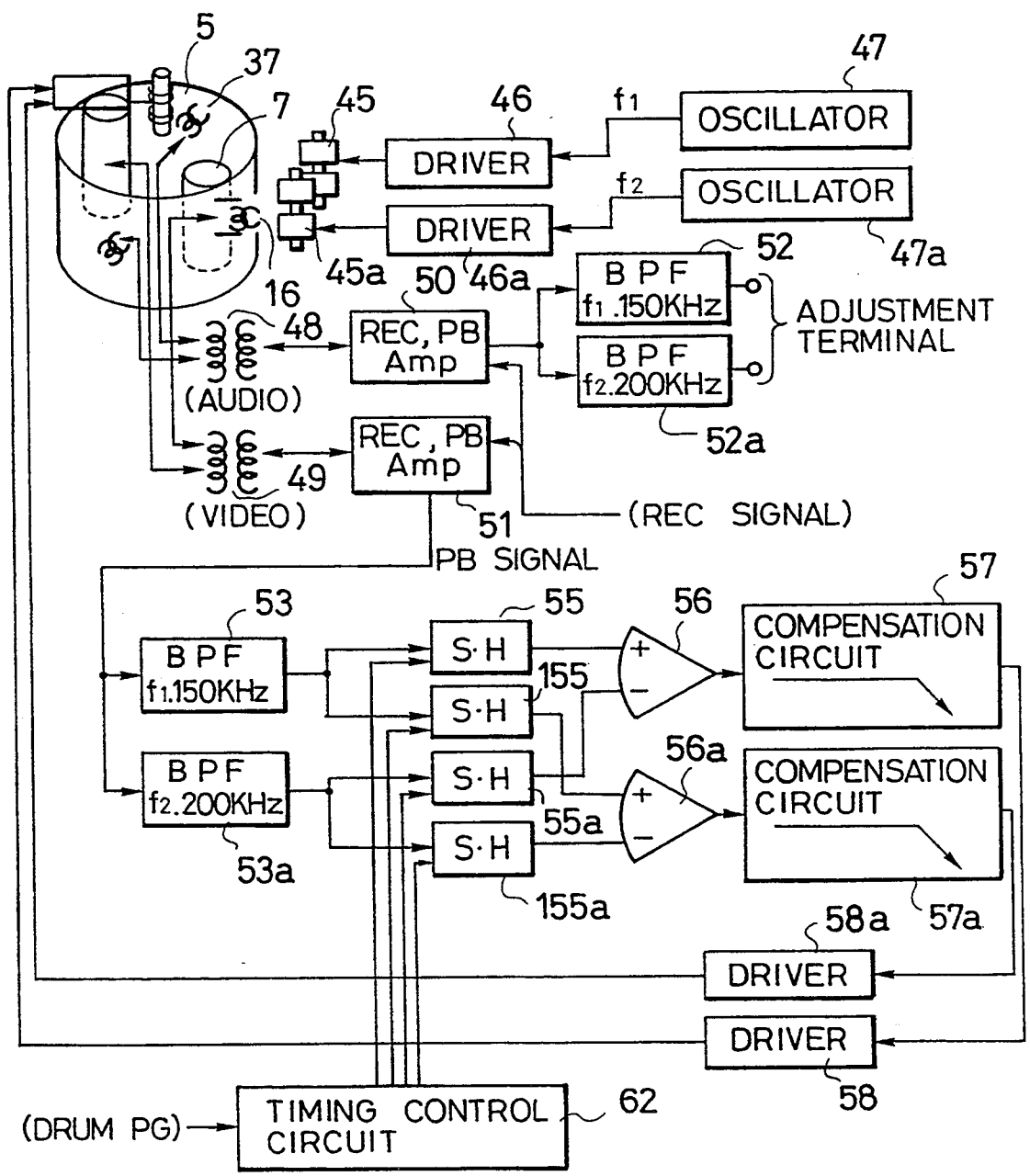
FIG. 9 is a block circuit diagram of a fourth embodiment of the present invention.

FIG. 9 is a block circuit diagram of the fourth embodiment of the subject invention, in which no divider is used.

In this fourth embodiment, the output of playback amplifier 50 of fixed head 37 is fed to bandpass filters 52 and 52a, which pass only frequencies $f_1$ and $f_2$. Then, while monitoring the level of playback signal output at regulating terminals, adjustments are made in the mounting position of AC magnetic field generator coils 45 and 45a, or in the drive output voltages of drivers 47 and 47a so that the amplitudes of the output signals of $f_1$ ($=150$ kHz) and $f_2$ ($=200$ kHz) are equalized. If this is done, and if height is controlled in such a way that the amplitudes of the playback signal components of frequencies $f_1$ and $f_2$ of the playback output from movable head 16 are equal, then it is possible to exert control such that the height difference between movable head 16 and fixed head 37 is eliminated, even without the use of a divider.

In terms of setting the control band, the embodiments in both FIGS. 4 and FIG. 8 are wholly identical with the embodiment in FIG. 9, with gain and phase compensation carried out in compensation circuits 57 and 57a.

Figure 10:
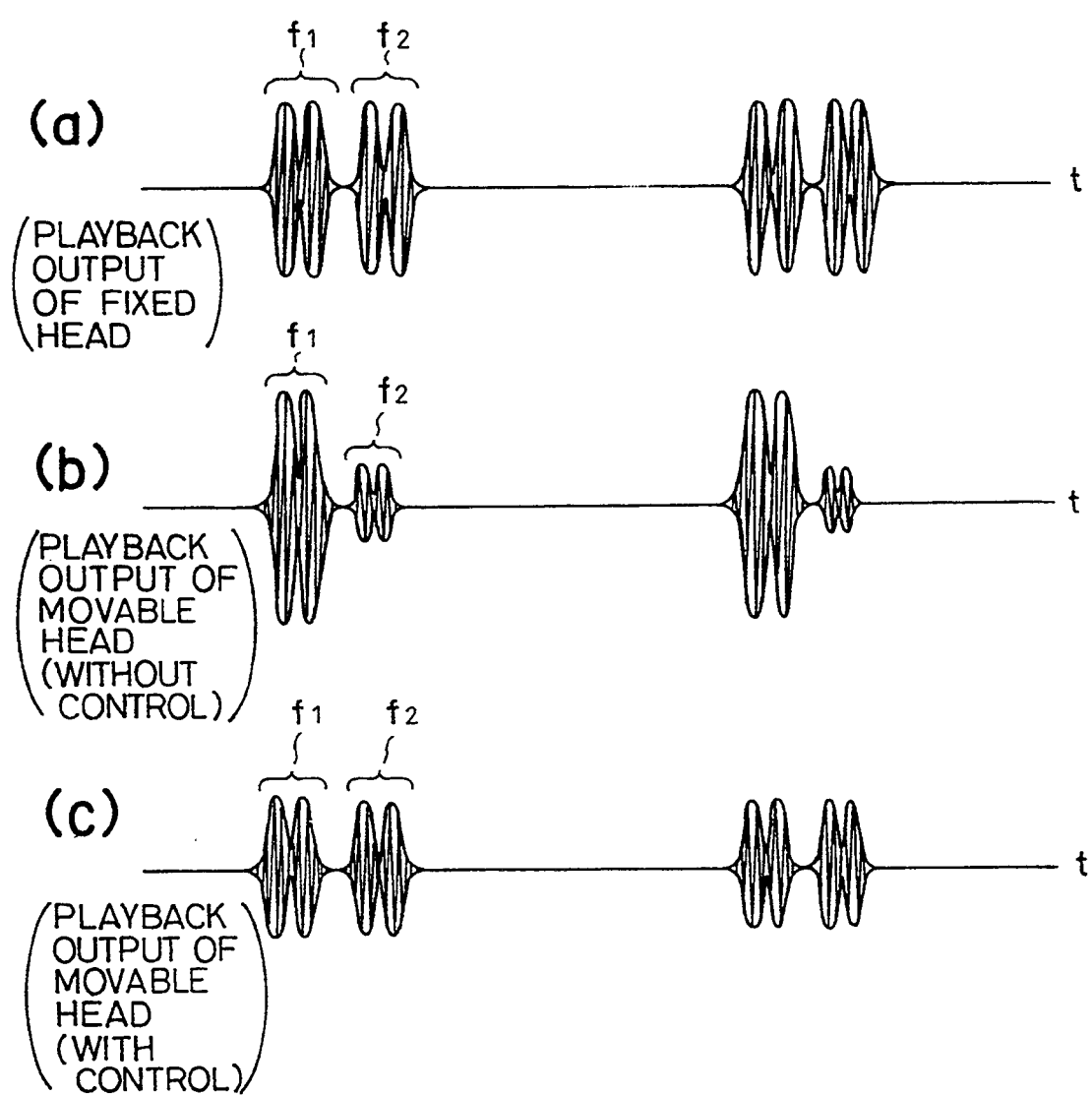
FIG. 10 is a drawing of the detection outputs of the fixed head and the movable head of this embodiment.

It should be noted that in general, magnetic heads pick up magnetic flux tangential to the periphery of upper drum 5, so that with AC magnetic field generator coils 45 and 45a configured as shown in FIG. 5, a playback envelope, as shown in FIG. 10, will be derived. In the configuration shown in FIG. 9, the playback outputs from fixed head 37 of $f_1$ and $f_2$ are adjusted to be equal.

This results in the condition shown in FIG. 10(a), and even if there should be a discrepancy between the head-to-head amplifier sensitivities of the movable head system, control will be exercised, when, as shown in FIG. 10(c), the level of the $f_1$ and $f_2$ components is equalized, to eliminate height difference.

FIFTH EMBODIMENT

Figure 12:
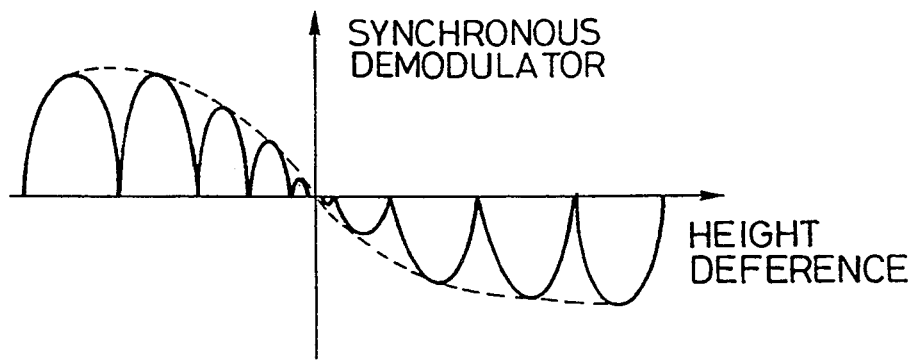
FIG. 12 is a graph showing the output waveform of the synchronous detection circuit of this embodiment.

FIG. 11 is a block circuit diagram of a fifth embodiment of the subject invention, similar to the configuration of the differential transformers generally used as a differential transducer for detecting minute displacements, in which the height of the midpoint between the two coils 45U of AC magnetic field generator coil 45 is so arranged as to be the same as the height of fixed head 37, so that when movable head 16 moves in the vertical direction, the shifts in the phase and amplitude of the reproduced signal varies, and such variation is detected by a synchronous demodulator circuit 63 as shown in FIG. 12, thereby providing detection of the direction and amount o shift in the head height difference.

In this case again, processing after synchronous demodulation and sample-hold is the same as in the embodiments shown in FIGS. 4, 8 and 9.

Figure 13:
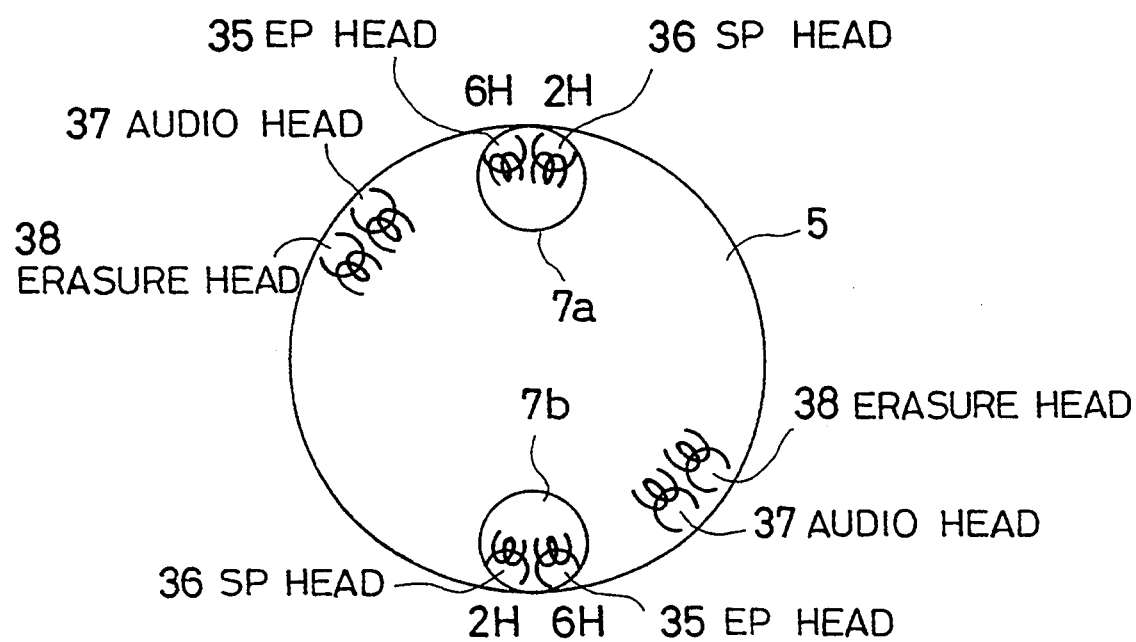
FIG. 13 is a drawing of one arrangement of magnetic heads and an upper drum that is possible in accordance with the present invention.
Figure 29:
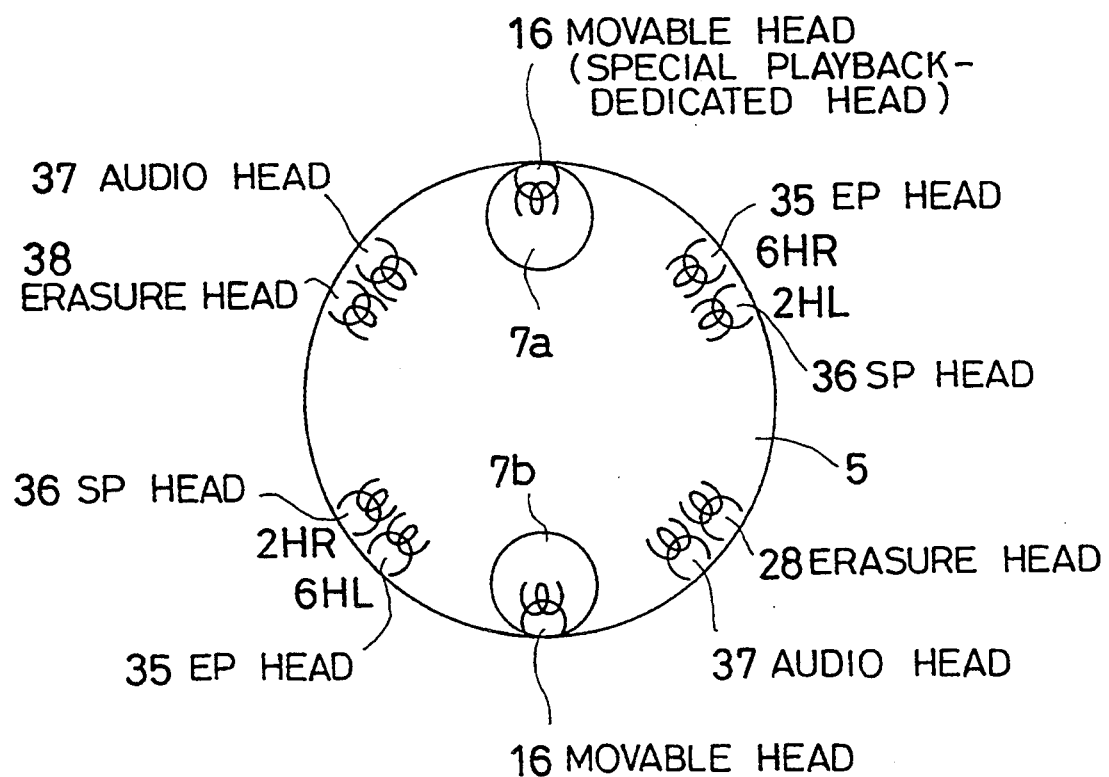
FIG. 29 is a plan view of a conventional arrangement of movable heads mounted to an upper drum and fixed heads.
Figure 30:
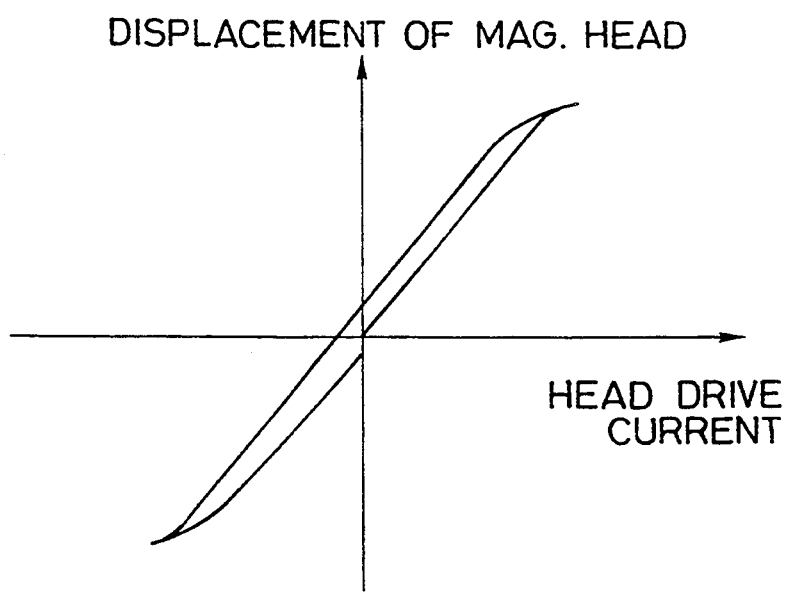
FIG. 30 is a graph showing the hysteresis characteristics of actuator drive current and movable head displacement.

If, in this way, control is exercised so that the height difference between movable head 16 and fixed head 37 is consistently eliminated, there will be no need to mount record-only fixed heads 35 and 36 shown in FIG. 29 on upper drum 5, and it will be possible to effect not only recording, standard playback and special playback of video signals, for example, by means of a movable head 16 mounted on actuator 7, but also adjustments in the height with respect to fixed head 37. Accordingly, as is shown in FIG. 13, it will be possible to dispose hi-fi audio head 37 and erasing head 38 used in editing on upper drum 5, and allow EP head 35 and SP head 36 to be mounted on actuator 7, thereby achieving a head disposition that is much simpler than that shown in FIG. 29.

SIXTH EMBODIMENT

It may be noted that the embodiment shown FIG. 9 depicts a case in which it is possible to equalize the amplitudes of frequencies $f_1$ and $f_2$ of the reproduced signal of movable head 16 by adjustments of the mounting position of AC magnetic field generator coil 45 and adjustments of the drive voltage level, but there will be cases in which equal amplitudes will not be achievable by adjustments of mounting position and drive voltage level, or in which, due to temperature characteristics or long-term changes, initial adjustments alone will not be sufficient for practical application.

FIG. 14 is a block circuit diagram of a sixth embodiment of the present invention in which an AC magnetic field generator is provided that effects automatic adjustment electrically such that the amplitudes of the playback output are equalized. The arrangement of this embodiment is useful where the amplitudes of the playback output of fixed head 37 are not equalized by adjustments of the mounting of AC magnetic field generator coils 45 and 45a, or by adjustments to drive voltage level. In the figure, reference numerals 65 and 65a designate variable-gain amplifiers for controllig the AC magnetic field generated by coils 45 and 45a.

In this embodiment, variable-gain control amplifiers 65 and 65a are inserted, and the outputs of sample-hold circuits 54 and 54a are applied to the gain control input terminals of gain control amplifiers 65 and 65a, and control is effected so that the amplitudes of the output signals of bandpass filters 52 and 52a of the playback output of fixed head 37 are constant, and the amplitudes of $F_1$ and $f_2$ of the playback output of movable head 16 are constant, thereby maintaining constant amplitude (in this case, the playback amplitudes of $f_1$ and $f_2$ of the playback output of movable head 16 are always equal) irrespective of differences in the physical positioning of AC magnetic field generator coils 45 and 45a, temperature characteristics and long-term changes.

SEVENTH EMBODIMENT

Figure 15:
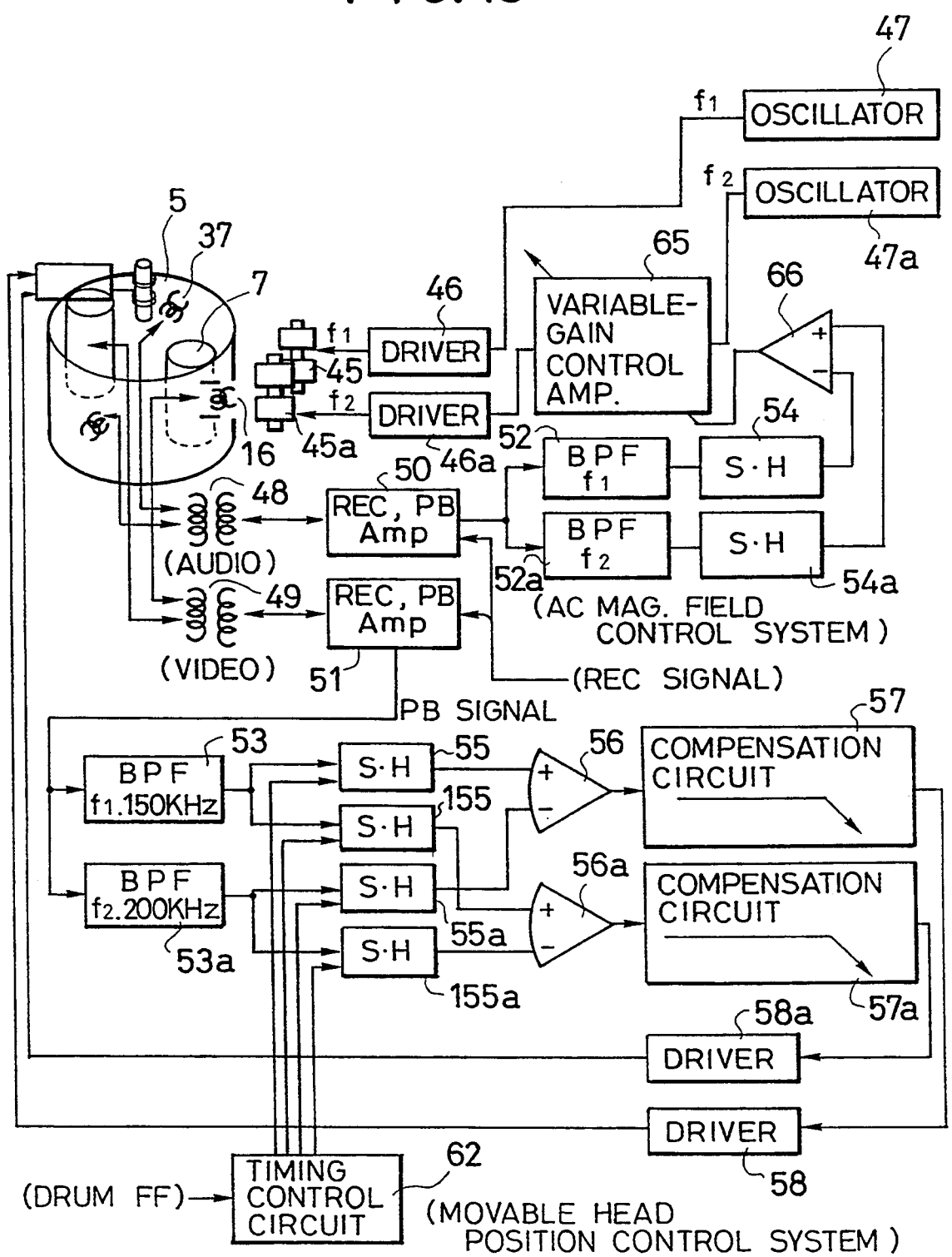
FIG. 15 is a block circuit diagram of a seventh embodiment of the present invention.

FIG. 15 is a block circuit diagram showing a seventh embodiment of the present invention, in which the magnetic field level control of the embodiment shown in FIG. 14 is achieved by adjustment using only a single AC magnetic field coil 45a. In the figure, a reference numeral 66 designates a differential amplifier.

In this embodiment, the signal components of frequencies $f_1$ and $f_2$ of the playback output of movable head 37 are extracted by bandpass filters 52 and 52a, and by obtaining in differential amplifier 66 the difference between the sample-hold values of the respective sample-hold circuits 54 and 54a, and inputting the drive voltage level of one of the AC magnetic field generator coils, 45a, to variable-gain control amplifier 65, control is exercised so that the level of playback output from the other AC magnetic field generator coil 45 and the first mentioned of the AC magnetic field generator coils 45a are equal, thereby obtaining the same effect as in the embodiment shown in FIG. 14.

Thus, through the addition of magnetic field control system for AC magnetic field generator coils 45 and 45a, it is possible to maintain the follow-up accuracy of the movable head height position control system, despite changes due to the differences in the mounting position adjustment of the AC magnetic field generator coils 45 and 45a, long-term changes in the level of electromagnetic induction, tempertaure characteristics and the like.

It should be noted that, although the embodiments of FIGS. 4 through 15 have been described as comprising analog circuitry, it will be obvious that a configuration may also be used in which the outputs of playback amplifiers 50 and 51, or of bandpass filters 52 and 53, are subjected to analog-digital conversion, processed in digital circuitry or by microprossure programs, and after sample-hold and compensation circuit processing, the outpur is subjected to digital-analog conversion to drive actuator 7.

Detail of AC Magnetic Field Generator

The following is a detailed description of the configuration of an AC magnetic field generator coil 45 that generates the magnetic field referred to above.

In order to effect abrupt changes in magnetic flux density with location, it is first necessary to concentrate the magnetic flux. A typical method that makes this possible is to pass electric currents to two opposed coils, shown in FIG. 6, so that a mutual repulsion is created. This method is convenient in that magnetic flux is then concentrated in the region between the coils, as shown in FIG. 7, and the flux diverges rapidly as distance from the core increases, resulting in a decrease in flux density. Thus, flux density changes abruptly is accordance with position. Be it noted, however, that as stated above, the change in flux density referred to here is not a change in the number of flux lines at a given position, but rather a change in the density of the flux in terms of the direction of movement of the movable head (that is to say in the direction of the shaft of upper drum) in the direction in which it can be detected by the movable head. It is therefore necessary to give consideration to the direction of the magnetic flux of AC magnetic field generator coil 45.

Figure 16:
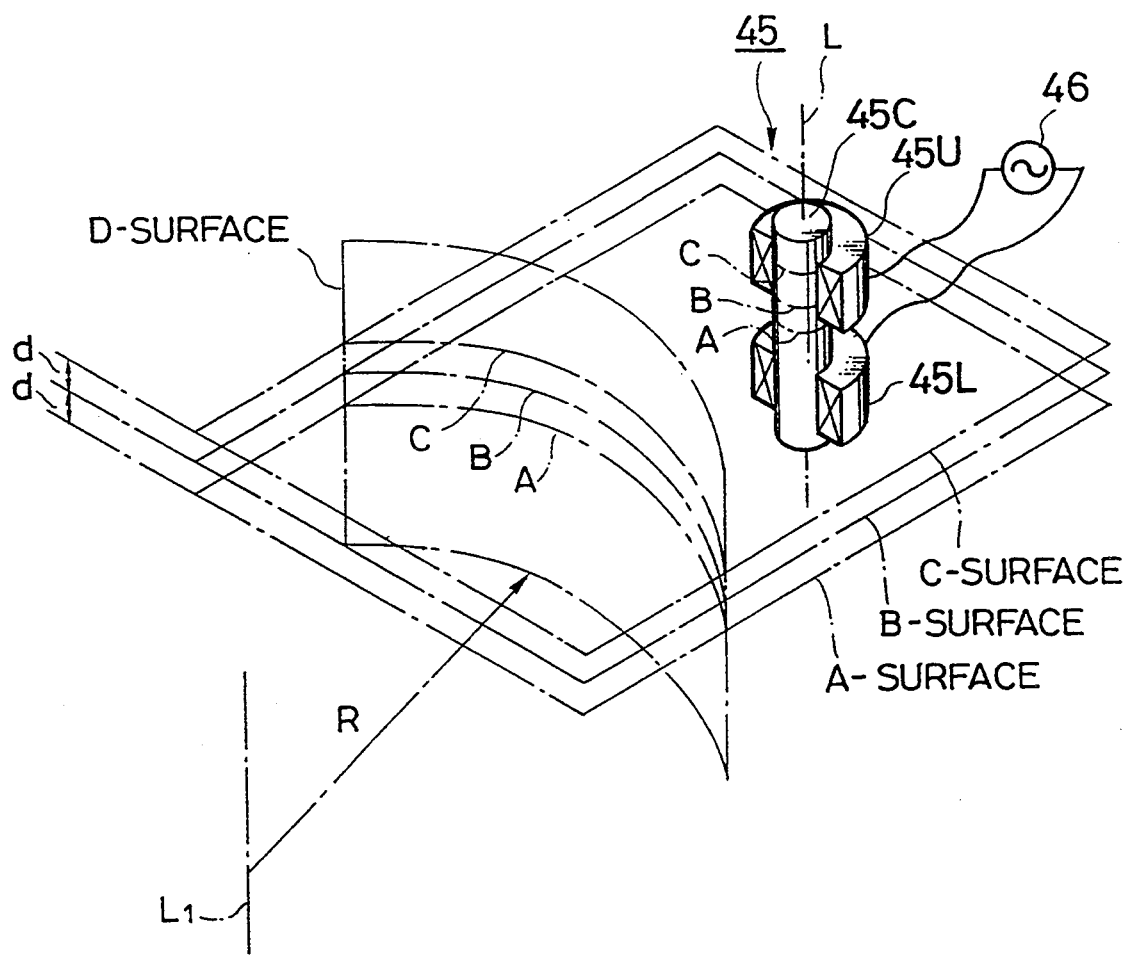

FIG. 16 is a schematic diagram showing coordinate surfaces for the investigation of the magnetic field distribution of AC magnetic field generator coil 45, in which reference numerals 45U and 45L designate coils; 45c designates a magnetic core made of soft iron or other soft magnetic material; 46 designates an AC power supply to energize the two coils; and A designates a surface that is normal to the central axis L1 of core 45c and also intersects the center line between the two coils 45U and 45L. A symbol B designates a surface that is parallel with and separated by a minute distance d from surface A; and C designates a surface that is parallel, with surfaces A and B and separated by a minute distance d from surface B and by a minute distance 2d from surface A. d designates a surface that is part of the side of a cylinder of radius R, having an axis parallel to the center axis L1 of core 45c. It is here taken tha tsurface D represents the side of upper drum 5, and that the lines of intersection of surface D with the othe flat surfaces represent the path of the movable head.

The current flowing in coils 45U and 45L is actually AC, but for the purpose of explaining the principle, we will here consider the case in which a direct current flows. FIG. 17 is a schematic diagram showing vectors that represent the flux at each of the flat surfaces when a direct current flows such that the poles of coils 15U and 45L exert a mutual repulsion. The shaded circle in FIG. 17 is a cross-section of core 45c, and the curved line X-X' represents the line of intersection of surface D with the flat surfaces.

First, looking at surface A, we see that the flux vectors at surface A are of large magnitude close to core 45c, and because the flux vectors have greater angles with respect to the surface A, the flux vector components on surface A become rapidly smaller as distance from core 45c increases.

At surface B, which is at a distance d from surface A, the rounding effect of the flux results in the flux vectors at surface B reaching maximum magnitude in a region somewhat separated from core 45c.

The situation at surface C is the same as that described at surface B, except for the fact that the flux rounds so that the flux vectors are closer to zero at surface C, and the absolute value of the vectors is smaller than at surface B.

Figure 18:
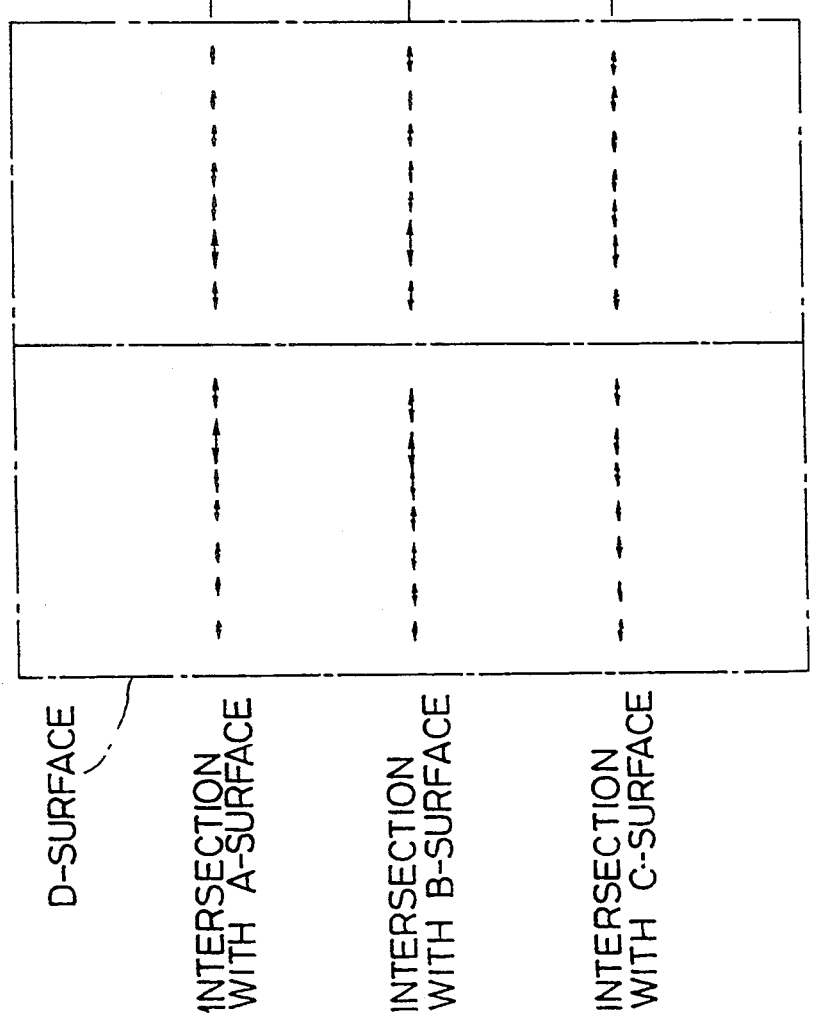

As has been previously stated, the curved line X-X' on each of the surfaces in FIG. 17 represents the path of the movable head, and the direction of magnetic flux that can be detected by the movable head is tangent to a point on line X-X'. FIG. 18 represents a development of curved surface D to a flat surface, with the flux shown in FIG. 17 being an AC flux, in which the arrows represent the flux vectors on a surface D—D intersecting surface D and the flat surfaces. Because the flux is an AC flux, arrows of opposite direction are paired.

Figure 19:
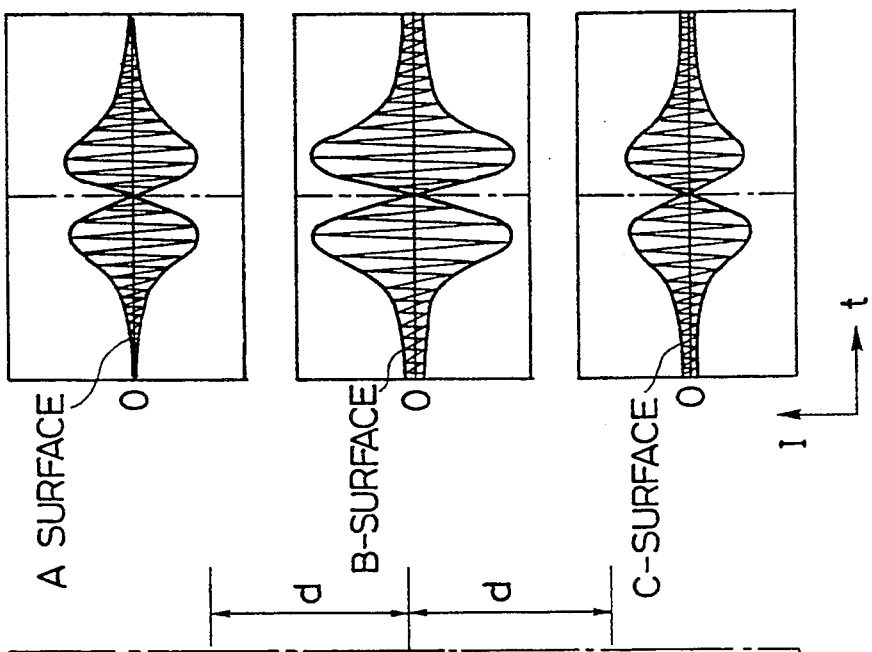

FIG. 19 shows the output waveform of the electromotive force from the movable head, when the movable head passed the intersection of surfaces A, B and C with surface D under the conditions of flux distribution shown in FIG. 18.

As will be appreciated from looking at the output waveform, the peak level differs at each of the surfaces; in this example the peak level for surface B is the greatest. Stated in another way, the peak level is a non-linear function that is dependent on the amount of displacement in the direction of the shaft of the upper drum in which the movable head is mounted. It is therefore possible by detecting the peak level of the output waveform to determine the absolute position of the movable head itself.

Considering the application of position control using the movable head as a position sensor, it will be desirable as a means of increasing sensor sensitivity to attach AC magnetic field generator coil 45 is such a way that a movable head can be fixed in the region in which the ratio of the change in the output waveform is large relative to the change in head height (the region between surfaces A and B, or between surfaces B and C in FIG. 18).

Further, the conditions of magnetic field distribution described hertofore have been in cases of driving AC magnetic field generator coil 45 at a specific AC voltage, but this field distribution is a function that depends on the voltage amplitude. Accodingly, this voltage value need only be adjusted so that the ratio of the peak level change to the change in head height previously described be maximized.

Figure 20:
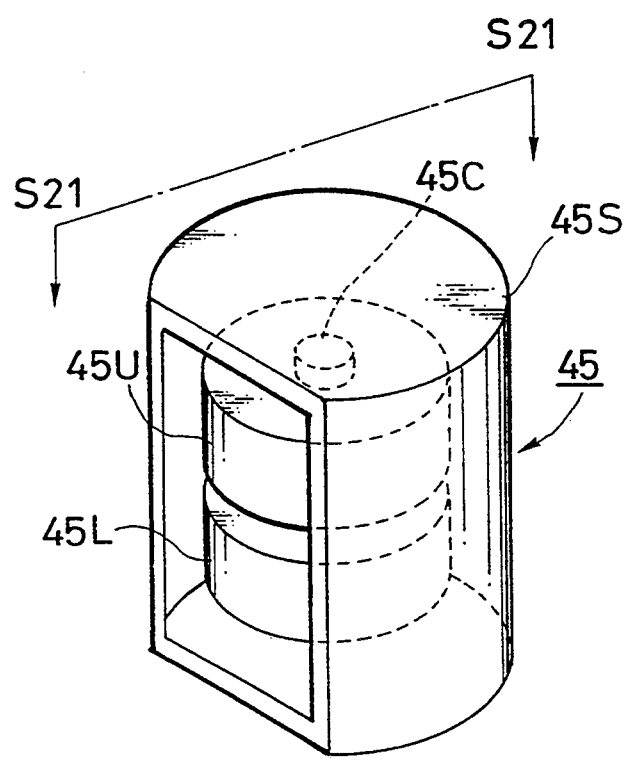
FIGS. 20 through FIG. 23 are drawings that show alternative configurations of the AC magnetic field generator coil.
Figure 21:
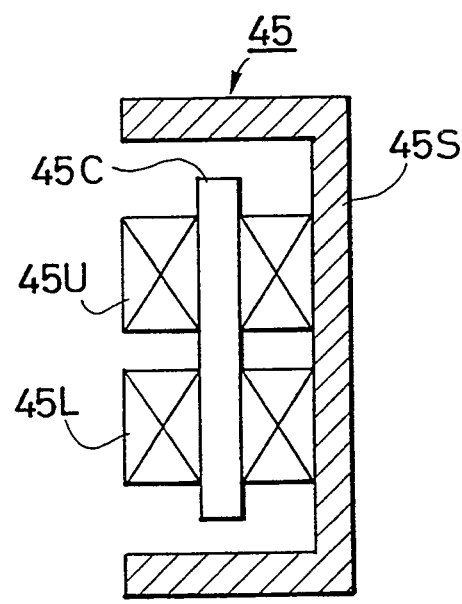

If the AC magnetic field generator coil 45 is thus mounted within the drum deck, there is a danger of the entry of noise in the linear audio head, or the erasure of information on the magnetic tape. One method of overcoming this problem is to provide magnetic shielding by enclosing a portion of a the magnetic field generator device with a soft magnetic material 455, as shown in FIG. 20. FIG. 21 is a cross-sectional view along line S21—S21, showing a configuration that, if adopted, eliminates the adverse effects referred to above.

Figure 22:
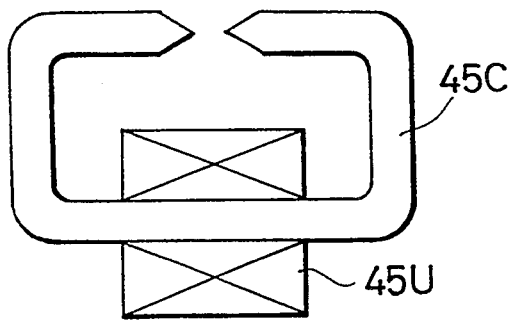
Figure 23:
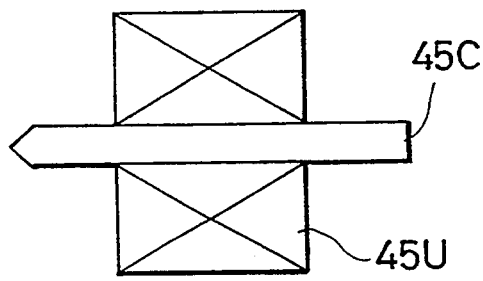
Figure 24:
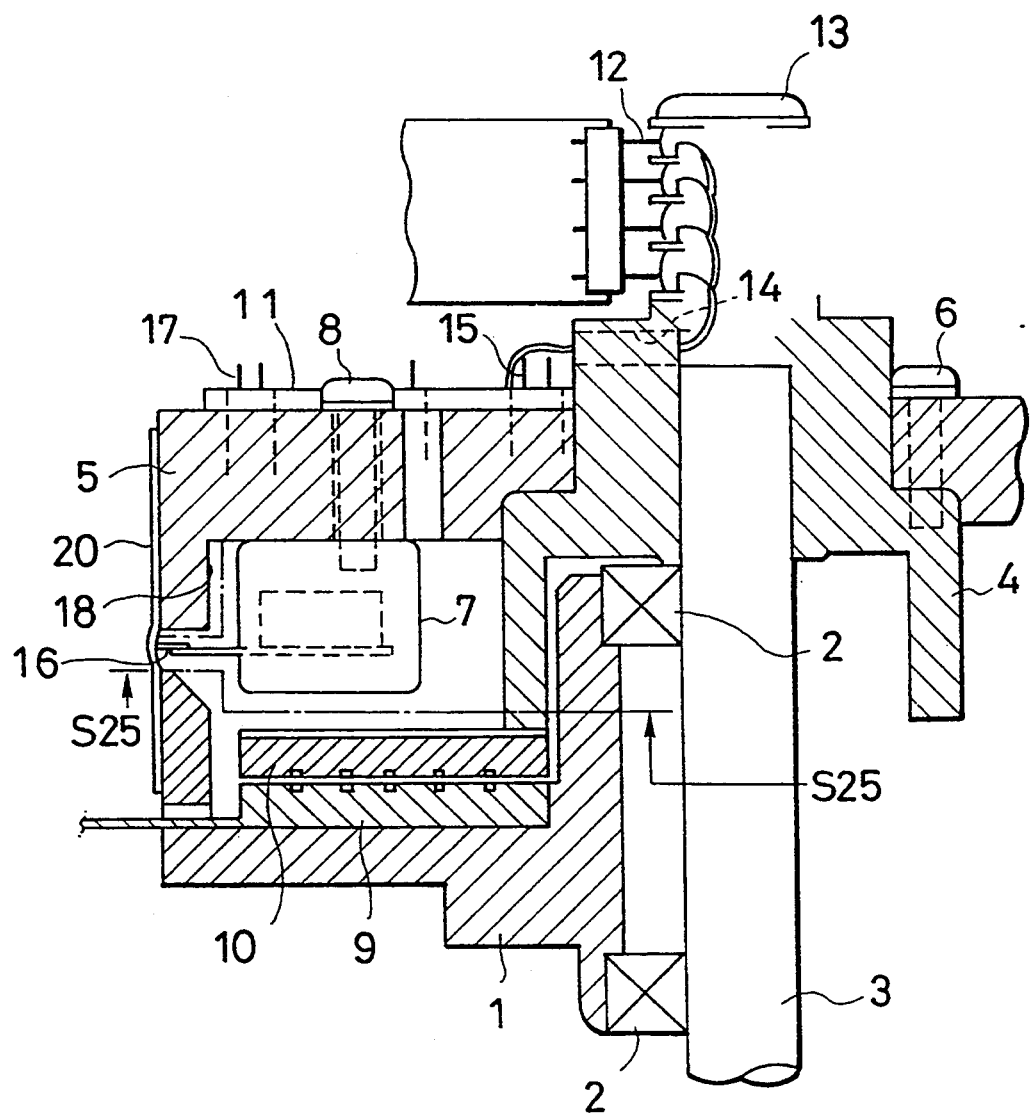
FIG. 24 is an enlarged cross-sectional drawing showing the configuration of the drum of a magnetic recording/playback device having a movable head.

Note that the embodiment described above is an example similar to that shown in FIG. 5, in which AC magnetic field generator coil 45 is configured to concentrate the magnetic flux, but it would be equally possible, at some sacrifice of sensor sensitivity, to adopt the configurations shown in FIGS. 22 or 23.

Further, in the example of a control system for fixing the positionof the movable head, audio fixed head 37 was used for reference position detection, it would be equally possible either to adopt another fixed head capable of detecting the absolute position, or t provide an additional head specifically for detecting absolute position.

Figure 35:
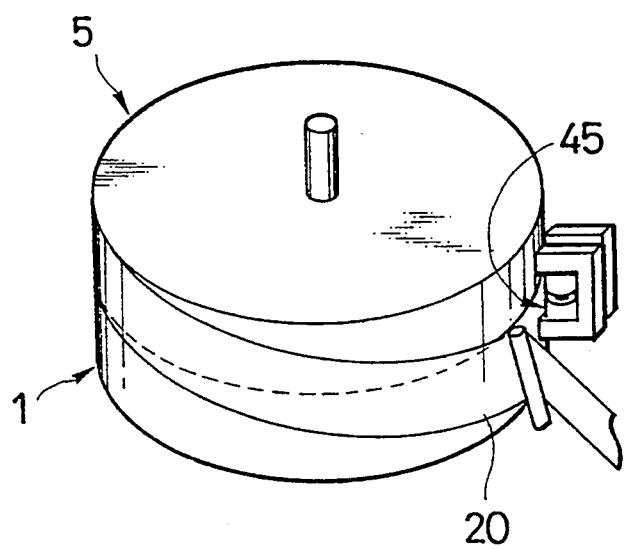
FIG. 35 is a diagram showing an AC magnetic field generator device actually mounted to a drum.
Figure 36:
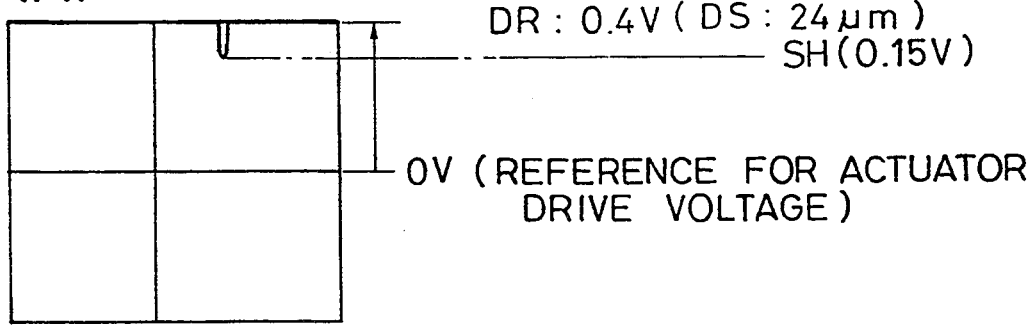
FIGS. 36(a)-36(d) show shows representations of the detection output of the movable head relative to the height of the movable head, for a typical experiment.
Figure 36:
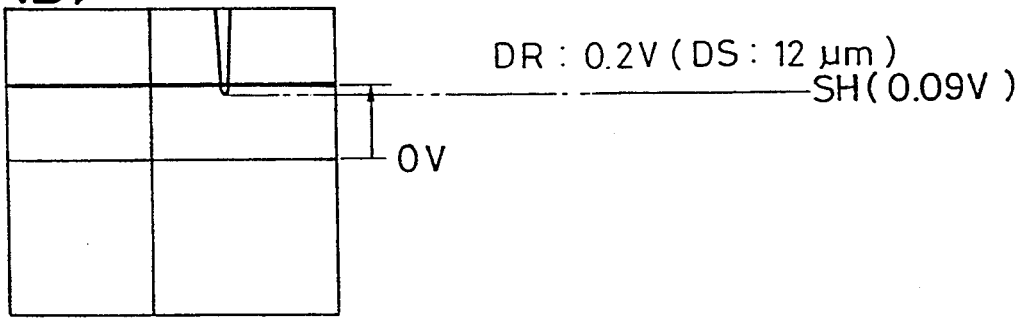
Figure 36:
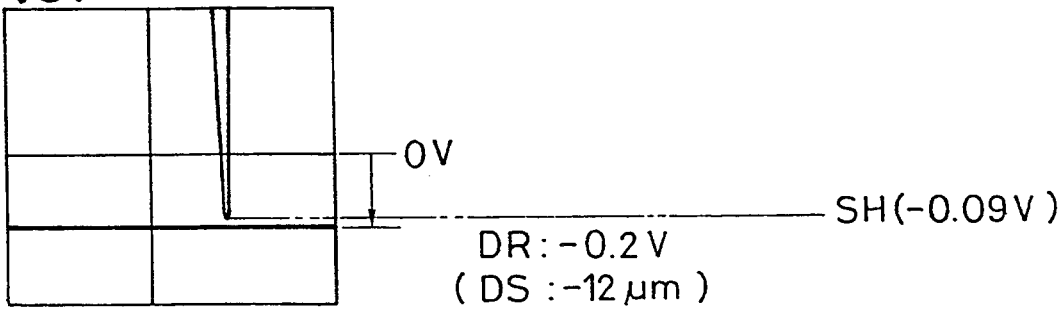
Figure 36:
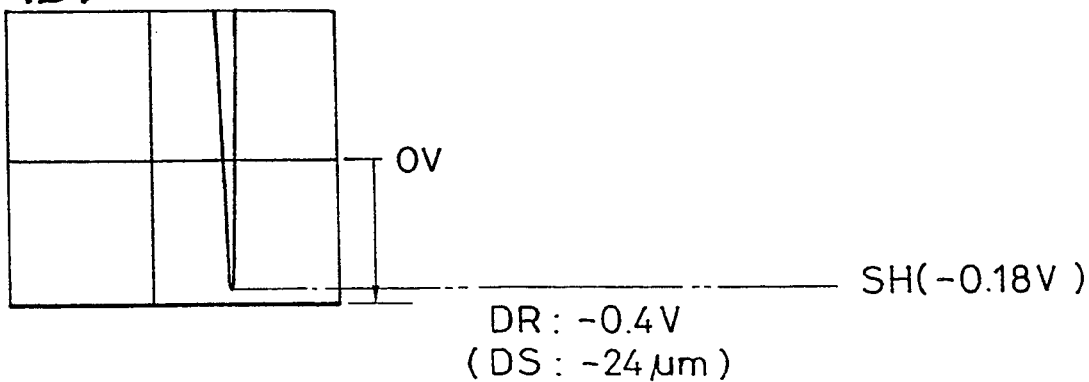
Figure 37:
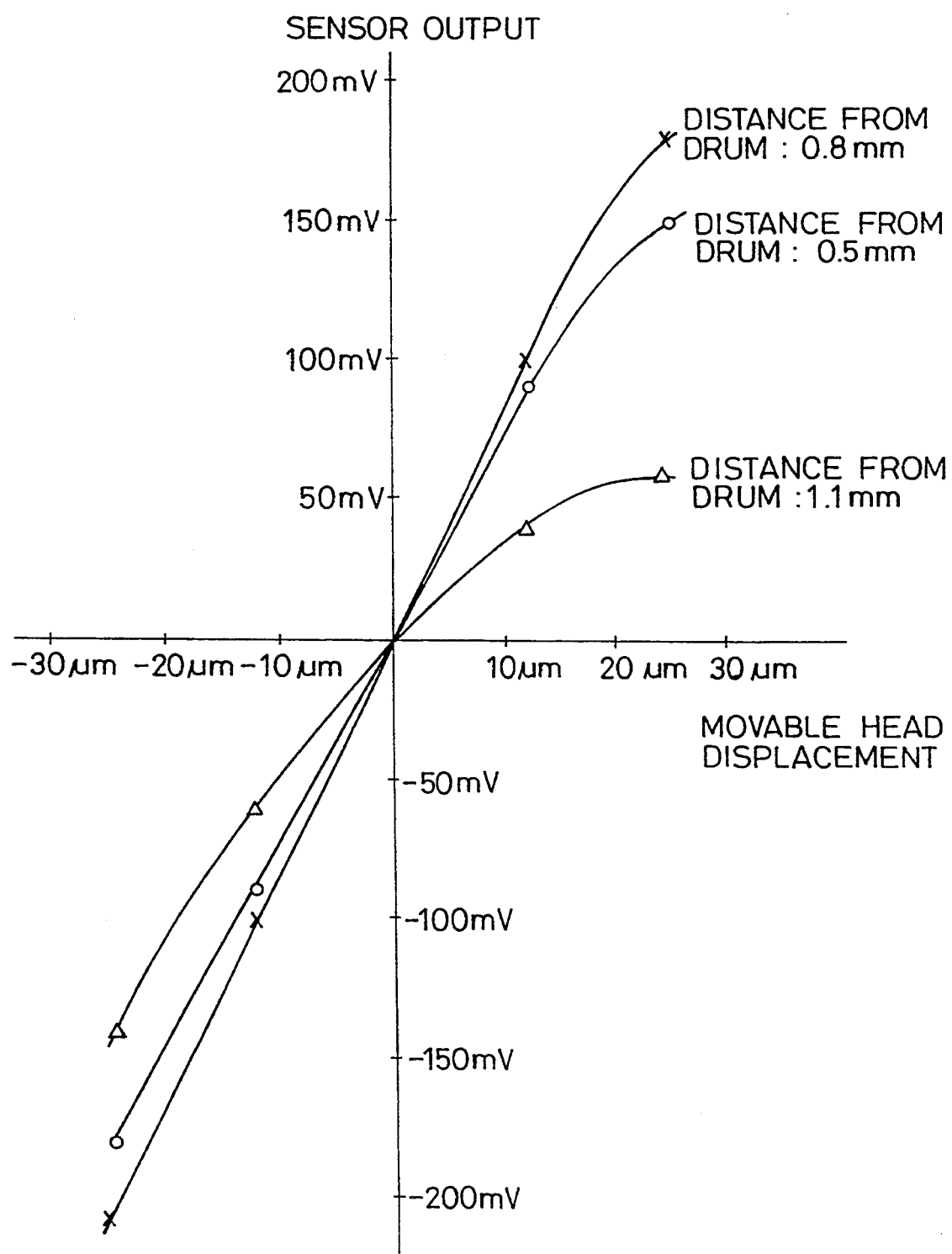
FIG. 37 is a graph showing experimental results for movable head height and movable head detection output obtained at various distances between the drum and the AC magnetic field generator coil.

FIG. 35 is a diagram shownning an AC magnetic field generator device actually mounted to a tape deck. FIG. 36 is a set of diagrams showing representations of the detection output (sensor output SH) of the movable head relative to the movable head height (displacement DS). FIG. 37 shows typical example of experimental results for movable head height (displacement DS) and movable head detection output (sensor output SH) obtained at various distances of the AC magnetic field generator coil 45 from the drum. In FIG. 36, the AC magnetic field generator coil 45 was mounted at a distance of 0.5 mm from the drum, and the detection output of the movable head (i.e., the output after passing the bandpass filter, the peak-hold circuit and the amplifier) was measured when the movable head moved: 24 $\mu$m upward (A), 12 $\mu$m upward (B), 12 $\mu$m downward (C), and 24 $\mu$m downward (D). These displacements are for the actuator drive voltages (DR) of 0.4 V (A), 0.2 V (B), −0.2 V (C) and −0.4 V (D), respectively. Movable head detection output voltages (sensor output SH) are 0.15 V (A), 0.09 V (B), −0.09 V (C), and −0.18 V (D), respectively. FIG. 37, is a graphic representation of data on the distance between the AC magnetic field generator coil 45 and upper drum 5, where the horizontal axis shows the displacement (DS) of the movable head and the vertical axis shown the detection output of the movable head (sensor output SH).

As has been described above, the effect of the subject invention is to obtain a magnetic recording/playback device in which an AC magnetic field generator device is disposed along the peripheral surfaces of an upper drum and a lower drum at a location at which magnetic tape is not wrapped, and in which the absolute position of a movable head is controlled on the basis of information for those two magnetic fields that are detected by the movable head, so that it can be positioned at a predetermined point, regardless of the hysteresis, temperature characteristics or long-term changes of the actuator, thereby enabling recording and playback of tracks for which recording and playback have been conventionally accomplished by a fixed head, to be accomplished instead by a movable head, improving the image quality and reducing the number of magnetic heads that are required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording/playback system comprising:
   a rotary drum;
   a movable head, mounted on said rotary drum and movable parallel to an axis of rotation of said rotary drum, for recording and reproducing data on a magnetic tape;
   a fixed head, mounted on said rotary drum, for recording and reproducing additional data on the magnetic tape;
   a fixed drum for supporting said rotary drum;
   AC magnetic field generating means, disposed along peripheral surfaces of said fixed and rotary drums at a location in which the magnetic tape is not wrapped on said fixed and rotary drums, for generating and applying an AC magnetic field that varies in a direction parallel to the axis of rotation;
   detecting means for detecting positional information of said movable head and said fixed head in accordance with detection signals derived by said movable and fixed heads indicative of the AC magnetic field; and
   position control means for controlling the position of said movable head by feeding the positional information to magnetic head driving means.

2. The magnetic recording/playback system according to claim 1, wherein the AC magnetic field varies within the range of movement of said movable head along the direction parallel to the axis of rotation,
   said detecting means separating the respective detection signals derived by said movable head and said fixed head, and
   said position control means controlling the position of said movable head so that the difference in level between the respective detection signals derived by said movable head and said fixed head approaches zero.

3. The magnetic recording/playback system according to claim 1, wherein said AC magnetic field generating means generates two AC magnetic fields of respective different frequencies at different positions along said fixed and rotary drums,
   said detecting means separating the respective detection signals derived by said movable and fixed heads in accordance with the two AC magnetic fields, and
   said position control means controlling the position of said movable head so that the difference in level between the respective detection signals approaches zero.

4. The magnetic recording/playback system according to calim 3, wherein the two AC magnetic fields are arranged at different positions along the axis of said rotary drum.

5. The magnetic recording/playback system according to claim 3, wherein the two AC magnetic fields are arranged at different positions along the direction of rotation of said rotary drum.

6. The magnetic recording/playback system according to claim 1, wherein said AC magnetic field generating means comprises:
   first and second AC magnetic field generator coils arranged in different positions along the direction of rotation of said movable head, for generating respective AC magnetic fields of first and second frequencies, each of said first and second AC magnetic field generator coils having a pair of oscillator coils wound to produce respective magnetic fluxes therethrough in opposite directions,
   said first AC magnetic field generator coil being fixed so that a midpoint between the corresponding pair of oscillator coils is higher than a height of said fixed head and said second AC magnetic field generator coil being fixed so that a midpoint between the corresponding pair of oscillator coils is lower than the height of said fixed head.

7. The magnetic recording/playback system according to claim 6, wherein said detecting means comprises:
   a first bandpass filter, coupled to said fixed head, for deriving a first detection signal of the first frequency in accordance with the respective AC magnetic field generated by said first AC magnetic field generator coil and subsequently detected by said fixed head;
   first holding means for detecting and holding a maximum value of the first detection signal;
   a second bandpass filter, coupled to said fixed head, for deriving a second detection signal of the second frequency in accordance with the respective AC magnetic field generated by a maximum value of the third detection signal;
   a fourth bandpass filter, coupled to said movable head, for deriving a fourth detection signal in accordance with the respective AC magnetic field generated by said second AC magnetic field generator coil and subsequently detected by said movable head;
   fourth holding means for detecting and holding a maximum value of the fourth detection signal; and
   a second divider for determining the ratio between outputs of said third and fourth holding means,
   said position control means comprising
   a differential amplifier for determining the difference between outputs of said first and second dividers; and
   driver means for driving said magnetic head driving means in accordance with a difference output from said differential amplifier to control the position of said movable head so that the difference determined by said differential amplifier approaches zero.

8. The magnetic recording/playback system according to claim 6, wherein said detecting means comprises:
   a first bandpass filter, coupled to said fixed head, for deriving a first detection signal of the first frequency in accordance with the respective AC magnetic field generated by said first AC magnetic field generator coil and subsequently detected by said fixed head;
   first holding means for detecting and holding a maximum value of the first detection signal;
   a second bandpass filter, coupled to said fixed head, for deriving a second detection signal of the second frequency in accordance with the respective AC magnetic field generated by said second AC magnetic field generator coil and subsequently detected by said fixed head;
   second holding means for detecting and holding a maximum value of said first detection signal;
   a third bandpass filter, coupled to said movable head, for deriving a third detection signal of the second frequency in accordance with the respective AC magnetic field generated by said first AC magnetic field generator coil and subsequently detected by said movable head;

third holding means for detecting and holding a maximum value of said third detection signal;
a fourth bandpass filter, coupled to said movable head, for deriving a fourth detection signal in accordance with the respective AC magnetic field generated by said second AC magnetic field generator coil and subsequently detected by said movable head; and
fourth holding means for detecting and holding a maximum value of said fourth detection signal,
said position control means comprising
AC magnetic field control means for controlling a magnitude of at least one of the respective AC magnetic fields generated by said first and second AC magnetic field generator coils in accordance with outputs of said first and second holding means;
a differential amplifier for determining the difference between outputs of said third and fourth holding means; and
driver means responsive to the output of said third and fourth holding means for controlling the position of said movable head so that the difference determined by said differential amplifier approaches zero.

9. A magnetic recording/playback system comprising:
a rotary drum having a rotary axis about which it rotates;
AC magnetic field generating means including first and second magnetic field generating coils for generating first and second AC magnetic field components which are opposed to each other to generate an AC magnetic field which varies sharply along the direction of said rotary axis;
a magnetic head disposed within and mounted to said rotary drum, movable parallel to said rotary axis, for sensing the AC magnetic field to produce a field detection signal dependent on the AC magnetic field which said magnetic head senses;
magnetic head driving means for moving said magnetic head parallel to said rotary axis;
position information generating means for generating information on the position of said magnetic head in accordance with said detection signal; and
position control means for controlling the position of said magnetic head by feeding said position information back to said magnetic head driving means, 10. The magnetic recording/playback system according to claim 9, wherein
said AC magnetic field generating means is disposed outside said rotary drum, and
said magnetic head is a movable head which rotates with said rotary drum.

11. The magnetic recording/playback system according to claim 9, wherein
said first and second magnetic field generating coils respectively generate AC magnetic field components of frequencies different from each other which vary along the direction of said rotary axis,
said magnetic head sensing the AC magnetic field components from said first and second magnetic field generating coils and producing first and second detection signals dependent on the respective AC magnetic field 12. The magnetic recording/playback system according to claim 11, wherein said position information generating means includes means for determining the difference between the amplitudes of said first and second detection signals to obtain a position signal representing the position of said magnetic head.

13. The magnetic recording/playback system according to claim 11, wherein said position information generating means includes means for determining the ratio between the amplitudes of said first and second detection signals to obtain a position signal representing the position of said magnetic head.

14. A magnetic recording/playback system comprising:
a rotary drum having a rotary axis about which it rotates;
AC magnetic field generating means for generating an AC magnetic field which varies along the direction of said rotary axis, said magnetic field generated by said AC magnetic field generating means being of a predetermined frequency;
magnetic sensing means for sensing said AC magnetic field to produce a field detection signal dependent on the sensed AC magnetic field;
a bandpass filter, coupled to said magnetic sensing means, for passing a component of said field detection signal of said predetermined frequency and for removing other components to eliminate noise;
level signal producing means, coupled to said bandpass filter, for producing a signal having a level corresponding to the magnitude of an output of said bandpass filter;
a movable head, disposed within and mounted to said rotary drum and movable in parallel to said rotary axis, for sensing said AC magnetic field to produce a signal dependent on the sensed AC magnetic field; and
a fixed head, fixed to said rotary drum, for sensing said AC magnetic field to produce a signal dependent on the sensed AC magnetic field,
said magnetic sensing means including at least one of said movable head and said fixed head.

15. The magnetic recording/playback system according to claim 14, wherein said level signal producing means comprises:
sampling means for sample-holding the output of said bandpass filter at a timing when said movable head passes a position at which it senses said AC magnetic field generated by said AC magnetic field generating means to provide a peak-hold output.

16. The magnetic recording/playback system according to claim 14, further comprising:
movable head driving means for moving said movable head parallel to said rotary axis;
position information generating means for generating information on a position of said movable head in accordance with said field detection signal; and
position control means for controlling the position of said movable head by feeding said position information back to said movable head driving means.

17. The system according to claim 14, further comprising:
means for varying an AC current or an AC voltage supplied to said AC magnetic field generating means in such a manner that an amplitude of said field detection signal produced by said magnetic sensing means is maintained at a constant reference value, to thereby compensate for any errors in mounting said AC magnetic field generating means.

18. A magnetic recording/playback system comprising:
- a rotary drum having a rotary axis about which it rotates;
- AC magnetic field generating means including first and second AC magnetic field generators respectively producing AC magnetic fields of frequencies different from each other which vary along the direction of said rotary axis;
- magnetic sensing means for sensing the AC magnetic fields to produce first and second field detection signals dependent on the respective AC magnetic fields; and
- position information producing means, responsive to said first and second field detection signals, for producing information representing the position of said magnetic sensing means.

19. The magnetic recording/playback system according to claim 18, wherein said position information producing means includes means for determining the difference between the amplitudes of said first and second field detecting signals for producing a signal representing the position of said magnetic sensing means.

20. The magnetic recording/playback system according to claim 18, wherein said position information producing means includes means for determining the ratio between the amplitudes of said first and second field detection signals for producing a signal representing the position of said magnetic sensing means.

21. The magnetic recording/playback system according to claim 18, wherein
- said AC magnetic field generatign means is disposed outside said rotarty drum, and
- said magnetic sensing means is disposed inside said rotary drum.

22. The magnetic recording/playback system according to claim 21, further comprising:
- a movable head disposed within and mounted to said rotasry drum, movable parallel to said rotary axis of said rotary drum capable of detecting said AC magnetic fields; and
- a fixed head fixed to said rotary drum capable of detecting said AC magnetic fields,
- said magnetic sensing means including at least one of said movable head and said fixed head.

23. The magnetic recording/playback system according to claim 22, further comprising:
- movable head driving means for moving said movable head in the direction of said rotary axis; and
- position control means for controlling the position of said movable head by feeding the position information so detected back to said movable head driving means.

24. The magnetic recording/playback system according to claim 23, wherein said AC magnetic field generating means generates AC magnetic fields of two different frequencies arranged at different positions along said movable head.

25. The magnetic recording/playback system according to claim 24, wherein
said magnetic sensing means comprises both said movable head and said fixed head, said movable head producing movable-head detection signals indicative of the position of said movable head and said fixed head producing fixed-head detection signals indicative of the position of said fixed head, said first and second field detection signals comprising said movable-head detection signals and said fixed-head detection signals, said control means being responsive to said movable-head detection signals and said fixed-head detection signals.

26. The magnetic recording/playback system according to claim 24, wherein the AC magnetic fields are arranged at different positions along said rotary axis.

27. The magnetic recording/playback system according to claim 24, wherein the AC magnetic fields are arranged at different positions along the direction of rotation of said rotary drum.

28. The system according to claim 23, wherein said AC magnetic field generating means is so configured as to generate AC magnetic fields of an identical frequency arranged in different positions along the direction of the rotation of the movable head;
said detection means including,
- a first bandpass filter coupled to said movable head for deriving a first signal,
- a first holding circuit to detect and hold the maximum value of said first signal,
- a second bandpass filter coupled to said fixed head to derive a second signal, and
- a second holding circuit to detect and hold the maximum value of said second signal; said position control means including,
- differential amplifier to determine the difference between the outputs of said first and second holding circuits, and
- driver means for driving said movable head in accordance with said difference to control the position of said movable head in such a way that the difference determined by said differential amplifier approaches zero.

29. The magnetic recording/playback system according to claim 23, wherein
said first and second AC magnetic field generators are arranged in different positions along the direct of rotation of said movable head for generating magnetic fields of first and second frequencies,
each of said first and second AC magnetic field generators having a pair of oscillator coils which are wound to produce magnetic fluxes therethrough in opposite directions,
said first magnetic field generator being fixed so that a midpoint between the respective oscillator coils is higher than a height of said fixed head,
said second AC magnetic field generator being fixed so that a midpoint between the respective oscillator coils is lower than the height of said fixed head.

30. The magnetic recording/playback system according to claim 29, wherein said position information producing means comprises:
- a first bandpass filter, coupled to said fixed head, for deriving a first signal of said first frequency in accordance with the respective magnetic fields generated by said first AC magnetic field generator and subsequently detected by said fixed head;
- first holding means for detecting and holding a maximum value of said first signal;
- a second bandpass filter, coupled to said fixed head, for deriving a second signal of said second frequency in accordance with the respective magnetic fields generated by said second AC magnetic field generator and subsequently detected by said fixed head;
- second holding means for detecting and holding a maximum value of said second signal;

a first divider for determining the ratio between outputs of said first and second holding means;

a third bandpass filter, coupled to said movable head, for deriving a third signal of said first frequency in accordance with the respective magnetic fields generated by said first AC magnetic field generator and subsequently detected by said movable head;

third holding means for detecting and holding a maximum value of said third signal;

a fourth bandpass filter, coupled to said movable head, for deriving a fourth signal in accordance with the respective magnetic field generated by said second AC magnetic field generator and subsequently detected by said movable head;

fourth holding means for detecting and holding a maximum value of said fourth signal; and a second divider for determining the ratio between outputs of said third and fourth holding means, said control means comprising a differential amplifier for determining the difference between outputs of said first and second dividers; and driver means for driving said movable head driving means in accordance with a difference output from said differential amplifier to control the position of said movable head so that the difference determined by said differential amplifier approaches zero.

31. The magnetic record/playback system according to claim 29, wherein said position information producing means comprises:

a first bandpass filter, coupled to said fixed head, for deriving a first signal of said first frequency in accordance with the respective magnetic field generated by said first AC magnetic field generator and subsequently detected by said fixed head;

first holding means for detecting and holding a maximum value of said first signal;

a second bandpass filter, coupled to said fixed head, for deriving a second signal of said second frequency in accordance with the respective magnetic field generated by said second AC magnetic field generator and subsequently detected by said fixed head;

second holding means for detecting and holding a maximum value of said second signal;

a third bandpass filter, coupled to said movable head, for deriving a third signal of said first frequency in accordance with the respective magnetic field generated by said first AC magnetic field generator and subsequently detected by said movable head;

third holding means for detecting and holding a maximum value of said third signal;

a fourth bandpass filter, coupled to said movable head, for deriving a fourth signal in accordance with the respective magnetic field generated by said second AC magnetic field generator and subsequently detected by said movable head; and fourth holding means for detecting and holding a maximum value of said fourth signal, said control means comprising, AC magnetic field control means for controlling the magnitude of at least one of the respective magnetic fields generated by said first and second AC magnetic field generators in accordance with outputs of said first and second holding means;

a differential amplifier for determining the difference between outputs of said third and fourth holding means; and driver means, responsive to the output of said third and fourth holding means, for controlling the position of said movable head so that the difference determined by said differntial amplifier approaches zero.

32. A magnetic recording/playback system comprising:

a rotary drum having a rotary axis about which it rotates;

AC magnetic field generating means for producing an AC magnetic field which varies along the direction of said rotary axis;

a magnetic head disposed within and mounted to said rotary drum, movable parallel to said rotary axis, for sensing the AC magnetic field to produce a field detection signal dependent on the AC magnetic field which said magnetic head senses;

magnetic head driving means for moving said magnetic head parallel to said rotary axis;

position information generating means for generating information on the position of said magnetic head in accordance with said detection signal; and position control means for controlling the position of said magnetic head by feeding said position information back to said magnetic head driving means, said AC magnetic field generating means including first and second AC magnetic field gnerators respectively producing magnetic fields of frequencies different from each other which vary along the direction of said rotary axis, said magnetic head sensing the magnetic fields from said AC magnetic field generators and producing first and second detection signals dependent on the respective magnetic fields, said field detection signal comprising said first and second detection signals, said position information generating means, responsive to said first and second detection signals, generating said position information.

33. The magnetic recording/playback system of claim 32, wherein said AC magnetic field generating means is disposed outside said rotary drum, and said magnetic head is a movable head which rotates with said rotary drum.

34. The magnetic recording/playback system of claim 32, wherein said position information generating means includes means for determining the difference between the amplitudes of said first and second detection signals to obtain a position signal representing the position of said magnetic head.

35. The magnetic recording/playback system of claim 32, wherein said position information generating means includes means for determinging the ratio between the amplitudes of said first and second detection signals to obtain a position signal representing the position of said magnetic head.

36. A magnetic recording/playback system comprising:

a rotary drum having a rotary axis about which it rotates;

AC magnetic field generating means for producing an AC magnetic field which varies along the direction of said rotary axis;

a magnetic head disposed within and mounted to said rotary drum, movable parallel to said rotary axis, for sensing the AC magnetic field to produce a field detection signal dependent on te AC magnetic field which said magnetic head senses;

magnetic head driving means for moving said magnetic head parallel to said rotary axis;

position information generating means for generating information on the position of said magnetic head in accordance with said detection signal; and position control means for controlling the position of said magnetic head by feeding said position information back to said magnetic head driving means, said AC magnetic field generating means comprising a pair of coils aligned substantially coaxial with each other having first ends adjacent to each other and being exited so that the magnetic fields created inside the respective coils oppose each other wherein magnetic lines of force repel each other creating an area where the magnetic lines of force are dense in the vicinity of said first ends of said coils.

37. The system according to claim 36, wherein said coils are wound on a common core.

38. A magnetic recording/playback system comprising:

a rotary drum having a rotary axis about which it rotates;

AC magnetic field generating means for producing an AC magnetic field which varies along the direction of said rotary axis;

a magnetic head disposed within and mounted to said rotary drum, movable parallel to said rotary axis, for sensing the AC magnetic field to produce a field detection signal dependent on the AC magnetic field which said magnetic head senses;

magnetic head driving means for moving said magnetic head parallel to said rotary axis;

position information generating means for generating information on the position of said magnetic head in accordance with said detection signal; and position control means for controlling the position of said magnetic head by feeding said position information back to said magnetic head driving means, said AC magnetic field generating means including magnetic shield means for preventing emanation of magnetic lines of force therefrom.

39. A magnetic recording/playback system comprising:

a rotary drum having a rotary axis about which it rotates;

a movable magnetic head mounted on said rotary drum;

magnetic head driving means for moving said movable magnetic head parallel to said rotary axis;

AC magnetic field generating means comprising a plurality of magnetic field generators disposed outside said rotary drum at different positions, for respectively generating AC magnetic fields, the intensity of each of said AC magnetic fields varying along the direction of said rotary axis;

receiving means for detecting said AC magnetic fields and for generating detection outputs respectively corresponding to said AC magnetic fields;

comparing means for comparing the detection outputs of said receiving means and for producing a comparison output; and control means for performing position control of said magnetic head in the direction of said rotary axis in accordance with the comparison output.

* * * * *